US011735718B2

(12) United States Patent
Ye et al.

(10) Patent No.: US 11,735,718 B2
(45) Date of Patent: Aug. 22, 2023

(54) METHOD FOR PREPARING CARBON NANOSTRUCTURE COMPRISING MOLYBDENUM DISULFIDE, LITHIUM SECONDARY BATTERY CATHODE COMPRISING CARBON NANOSTRUCTURE COMPRISING MOLYBDENUM DISULFIDE, PREPARED THEREBY, AND LITHIUM SECONDARY BATTERY COMPRISING THE SAME

(71) Applicant: LG CHEM, LTD., Seoul (KR)

(72) Inventors: Seongji Ye, Daejeon (KR); Kwonnam Sohn, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 469 days.

(21) Appl. No.: 16/981,028

(22) PCT Filed: Aug. 12, 2019

(86) PCT No.: PCT/KR2019/010191
§ 371 (c)(1),
(2) Date: Sep. 15, 2020

(87) PCT Pub. No.: WO2020/045854
PCT Pub. Date: Mar. 5, 2020

(65) Prior Publication Data
US 2021/0050589 A1 Feb. 18, 2021

(30) Foreign Application Priority Data

Aug. 30, 2018 (KR) .................. 10-2018-0102690
Aug. 30, 2018 (KR) .................. 10-2018-0102699

(51) Int. Cl.
*H01M 4/1397* (2010.01)
*C01G 39/06* (2006.01)
(Continued)

(52) U.S. Cl.
CPC .......... *H01M 4/1397* (2013.01); *C01G 39/06* (2013.01); *H01M 4/0471* (2013.01);
(Continued)

(58) Field of Classification Search
None
See application file for complete search history.

(56) References Cited

U.S. PATENT DOCUMENTS

2010/0213420 A1 8/2010 Kamiya et al.

FOREIGN PATENT DOCUMENTS

| CN | 104051735 A | 9/2014 |
|----|-------------|--------|
| CN | 104409703 A | 3/2015 |

(Continued)

OTHER PUBLICATIONS

Machine Translation of CN 107959005 (Year: 2017).*
(Continued)

*Primary Examiner* — Wyatt P McConnell
(74) *Attorney, Agent, or Firm* — Birch, Stewart, Kolasch & Birch, LLP

(57) ABSTRACT

A method for preparing a carbon nanostructure including molybdenum disulfide is discussed. More particularly, a method is discussed for preparing a carbon nanostructure in which molybdenum disulfide is located on the surface by melt diffusion and heat treatment of a mixture of a molybdenum precursor, a carbon nanostructure, and sulfur. Also, a positive electrode of a lithium secondary battery including a carbon nanostructure including molybdenum disulfide as an additive, and a lithium secondary battery including the same. In the case of the lithium secondary battery including the positive electrode to which the carbon nanostructure including molybdenum disulfide was applied, the carbon nanostructure including the molybdenum disulfide adsorbs lithium polysulfide (LiPS) generated during the charging/
(Continued)

discharging process of the lithium secondary battery, thereby increasing the charging/discharging efficiency of the battery and improving lifetime characteristics.

13 Claims, 10 Drawing Sheets

(51) Int. Cl.
    *H01M 4/04*         (2006.01)
    *H01M 4/136*       (2010.01)
    *H01M 4/36*         (2006.01)
    *H01M 4/583*       (2010.01)
    *H01M 10/0525*    (2010.01)
    *H01M 4/02*         (2006.01)

(52) U.S. Cl.
    CPC ........... *H01M 4/136* (2013.01); *H01M 4/364* (2013.01); *H01M 4/583* (2013.01); *H01M 10/0525* (2013.01); *H01M 2004/028* (2013.01)

(56) References Cited

FOREIGN PATENT DOCUMENTS

| | | |
|---|---|---|
| CN | 103617693 B | 1/2016 |
| CN | 106711413 A | 5/2017 |
| CN | 107799757 A | 3/2018 |
| CN | 107959005 A | 4/2018 |
| CN | 108212178 A | 6/2018 |
| CN | 108232164 A | 6/2018 |
| JP | 6175596 B2 | 8/2017 |
| KR | 10-1264475 B1 | 5/2013 |
| KR | 10-1722875 B1 | 4/2017 |

OTHER PUBLICATIONS

Extended European Search Report for European Application No. 19854461.1, dated May 20, 2021.
Chen et al., "Chemical modification of pristine carbon nanotubes and their exploitation as the carbon hosts for lithium-sulfur batteries," International Journal of Hydrogen Energy, vol. 41, 2016, pp. 21850-21860.
International Search Report (PCT/ISA/210) issued in PCT/KR2019/010191, dated Nov. 22, 2019.
Jin et al., "Amorphous transition metal sulfides anchored on amorphous carbon coated multiwalled carbon nanotubes for enhanced lithium-ion storage," Chemistry—A European Journal, vol. 23, No. 56, 2017, pp. 14056-14063.
Li et al., "MoS2-decorated Coaxial N anocable Carbon Aerogel Composites as Cathode Materials for High Performance Lithium-Sulfur Batteries," Journal of Alloys and Compounds, vol. 692, 2017, pp. 40-48.
Ren et al., "Rational design of a multidimensional N-doped porous carbon/MoS2/CNT nano-architecture hybrid for high performance lithium-sulfur batteries," Journal of Materals Chemistry A, vol. 6, 2018, pp. 13835-13847.
Yan et al., "Enhanced performance of lithium-sulfur batteries with an ultrathin and lightweight MoS2/carbon nanotube interlayer," Journal of Power Sources, vol. 389, 2018, pp. 169-177.
Yan et al., "Facile synthesis of low crystalline MoS2 nanosheet-coated CNTs for enhanced hydrogen evolution reaction," Nanoscale, vol. 5, 2013, pp. 7768-7771.
Yoo et al., "Cylindrical nanostructured MoS2 directly grown on CNT composites for lithium ion batteries," Nanoscale, vol. 7, 2015, pp. 3404-3409.
Zhou et al., "MoS2 Nanolayers Grown on Carbon Nanotubes: An Advanced Reinforcement for Epoxy Composites," ACS Applied Materials & Interfaces, vol. 7, No. 11, 2015, pp. 6070-6081.
Koroteev et al., "Change Transfer in the MoS2/Carbon Nanotube Composite," The Journal of Physical Chemistry, vol. 115, 2011, pp. 21199-21204.

* cited by examiner

【Figure 1】
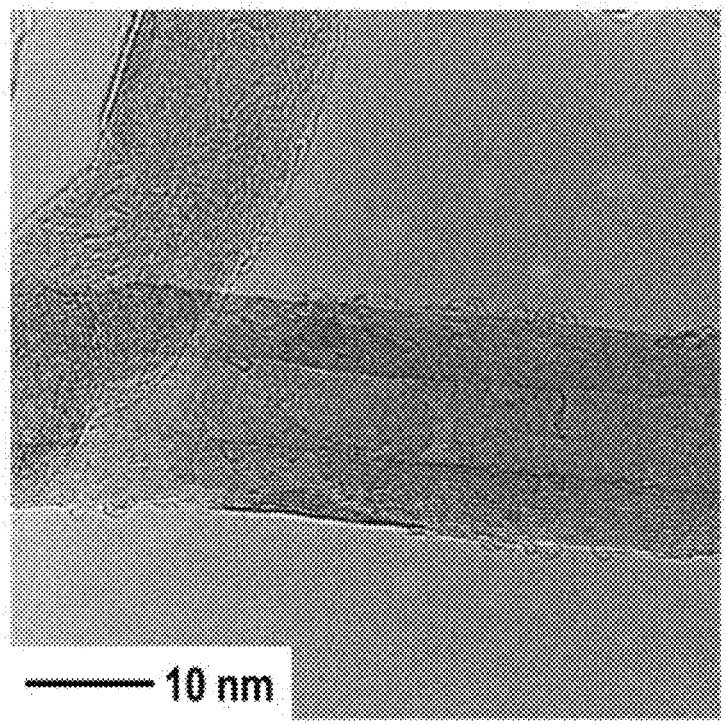
【Figure 2】
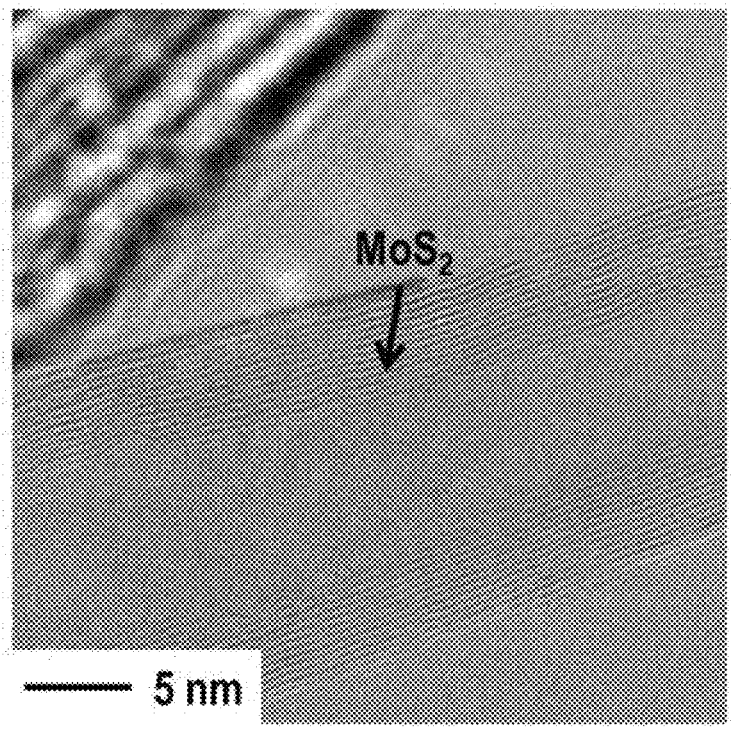

【Figure 3】
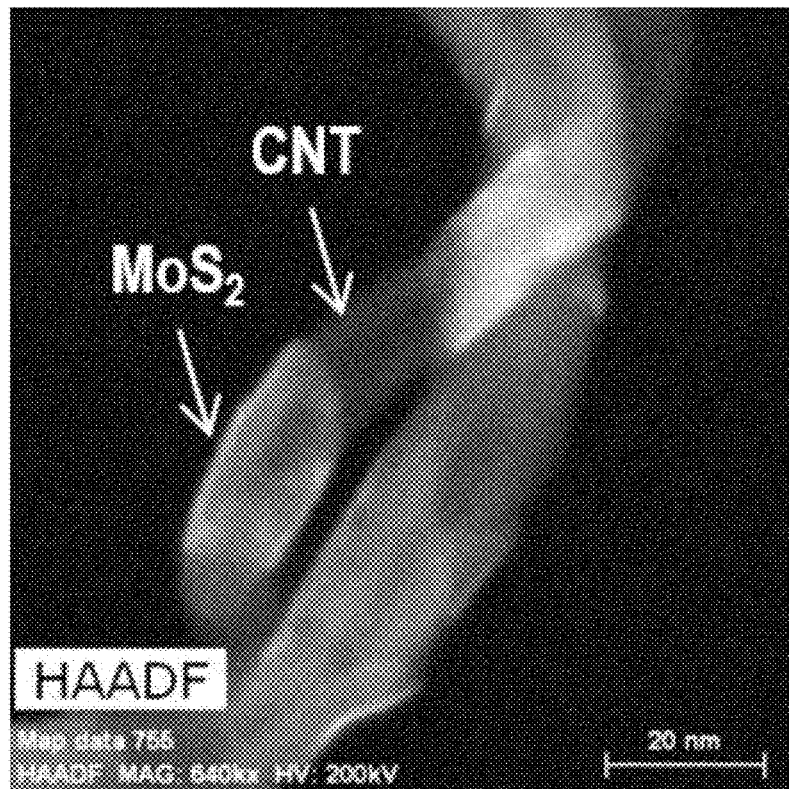
【Figure 4】
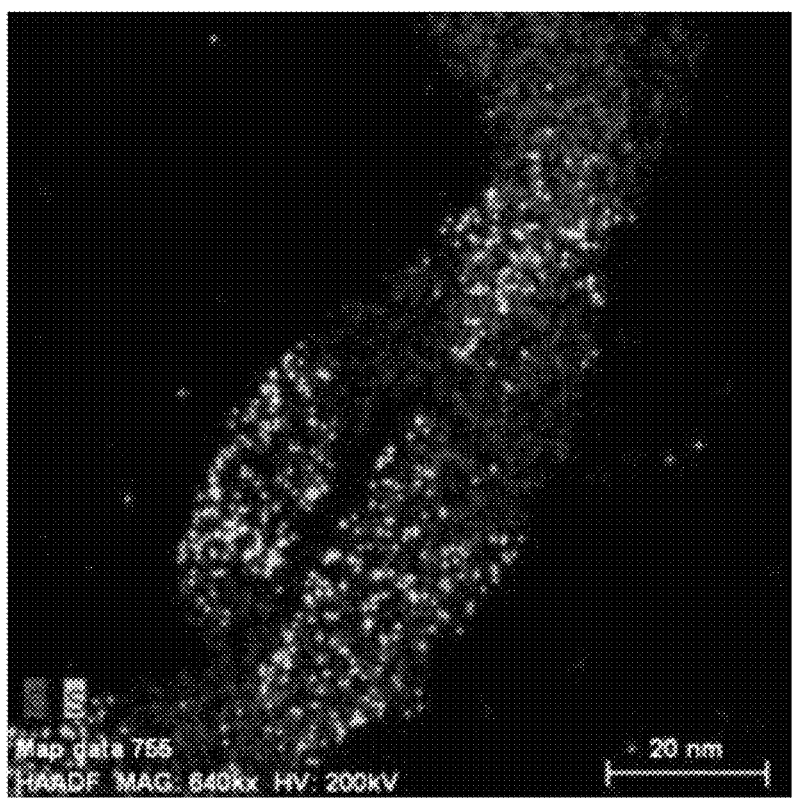

【Figure 5】
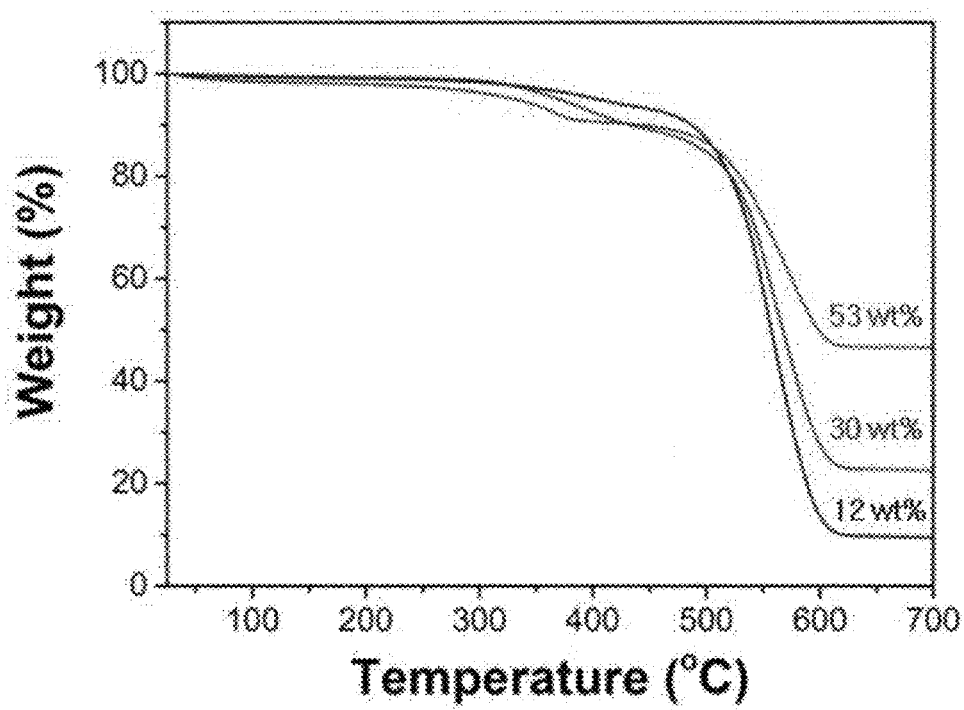
【Figure 6】
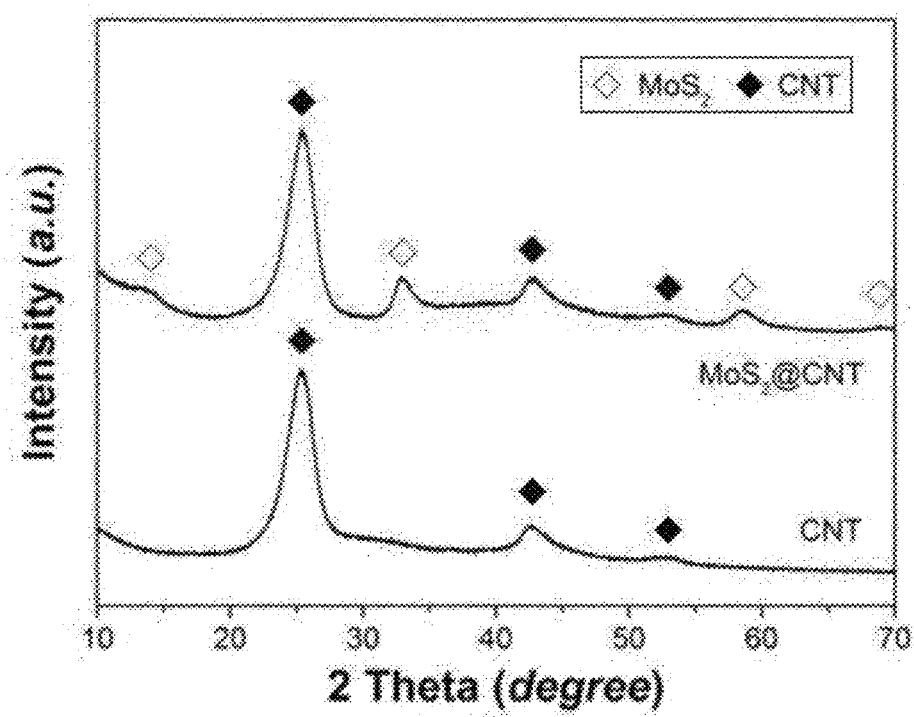

[Figure 7]
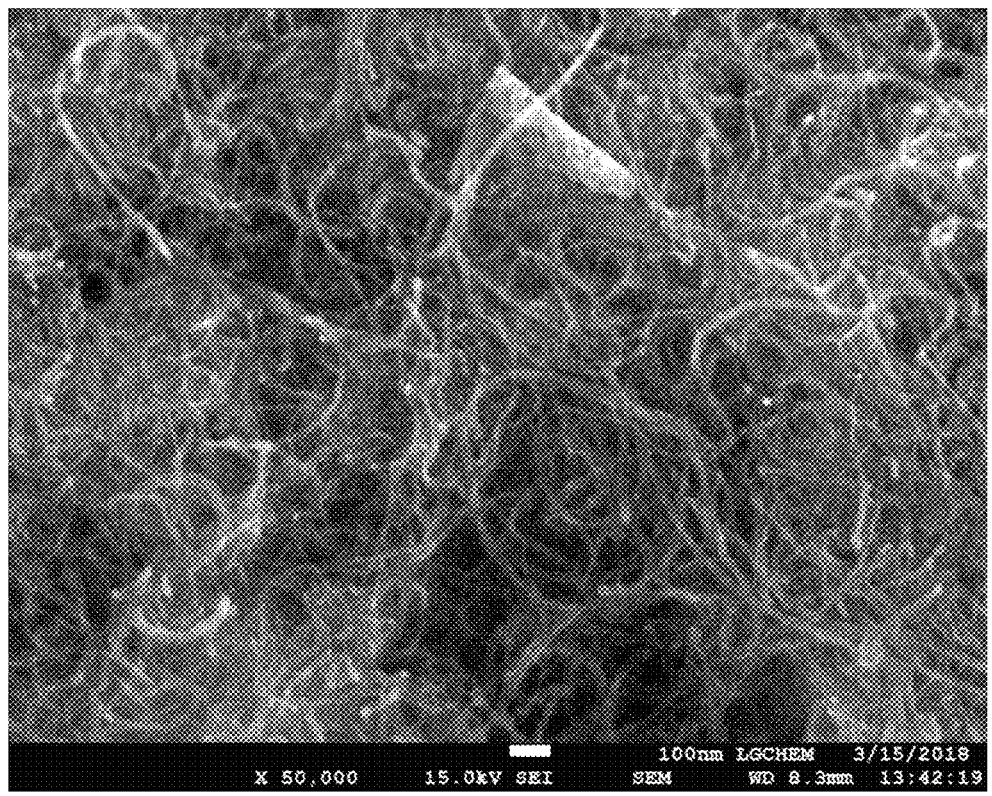
[Figure 8]
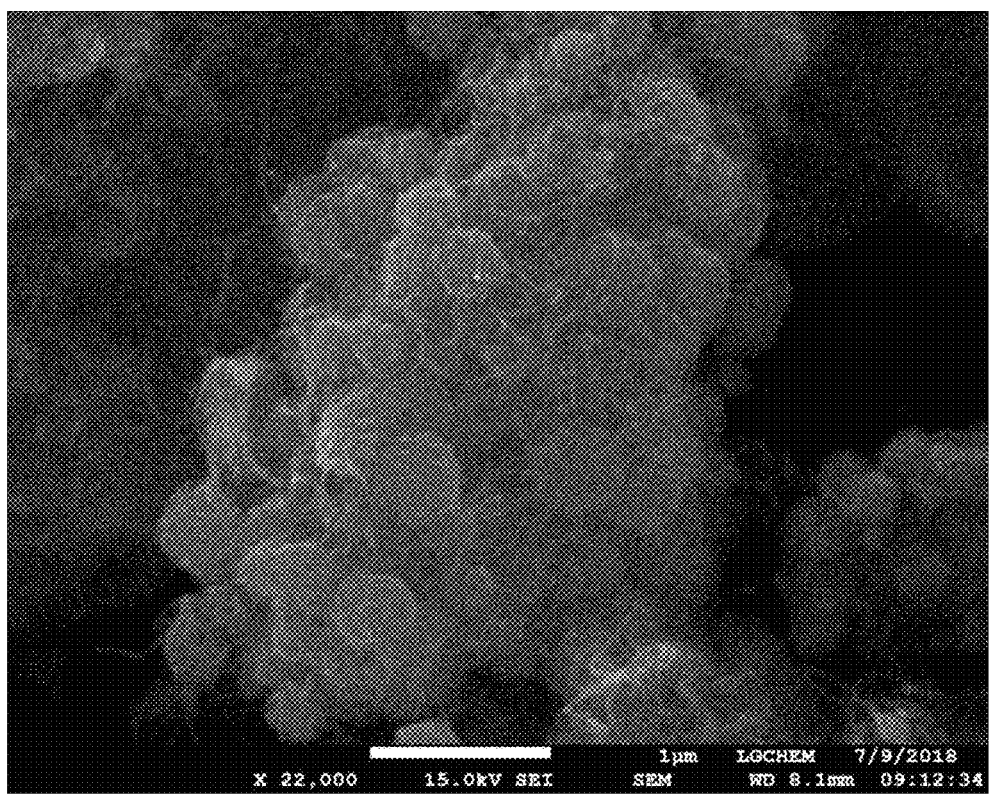

[Figure 9]
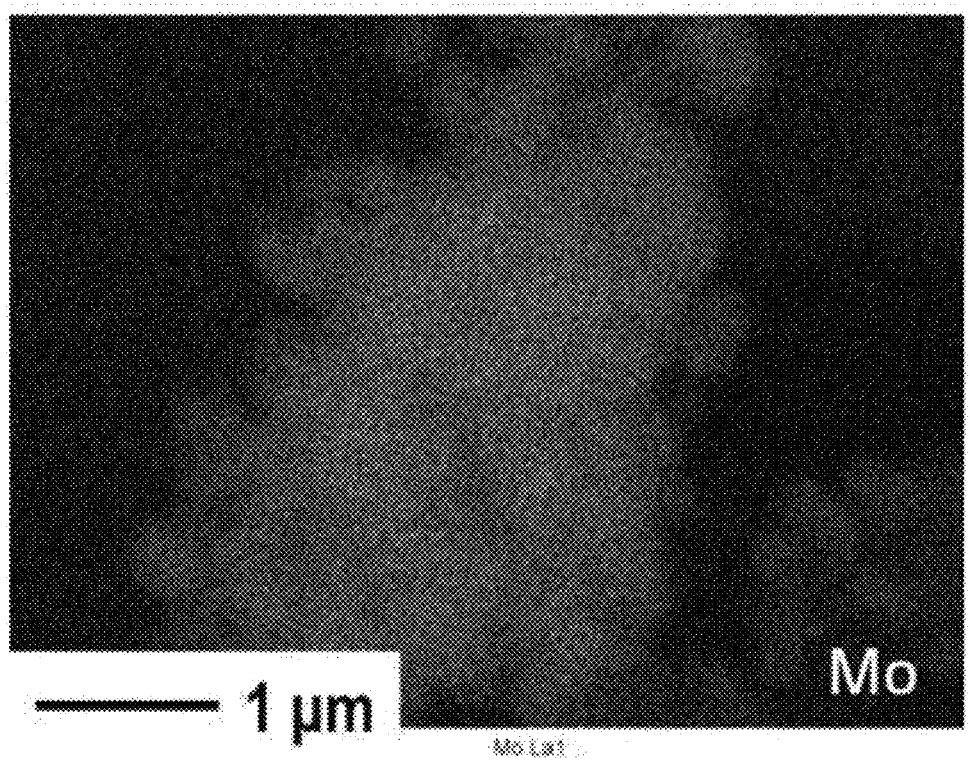
[Figure 10]
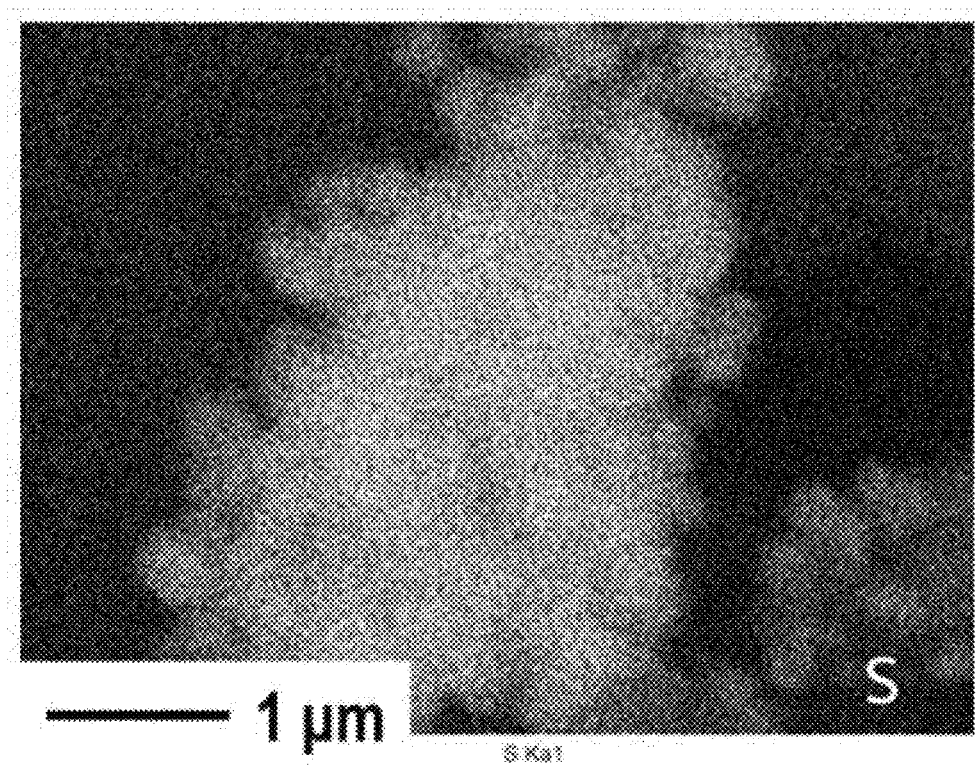

[Figure 11]
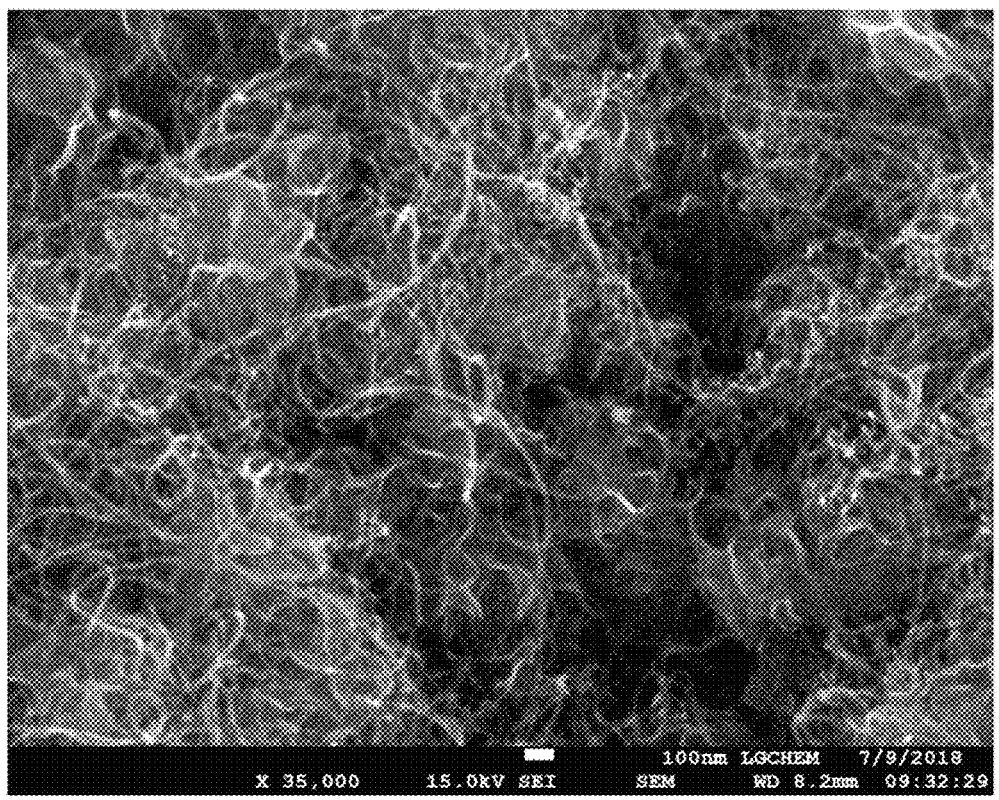
[Figure 12]
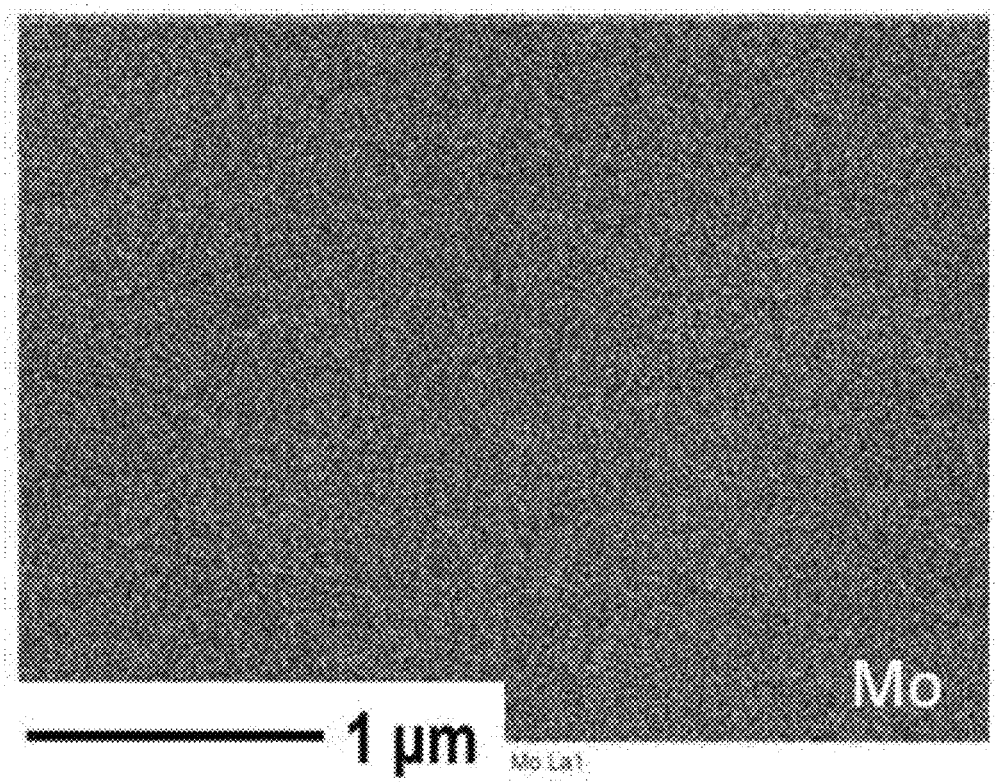

[Figure 13]
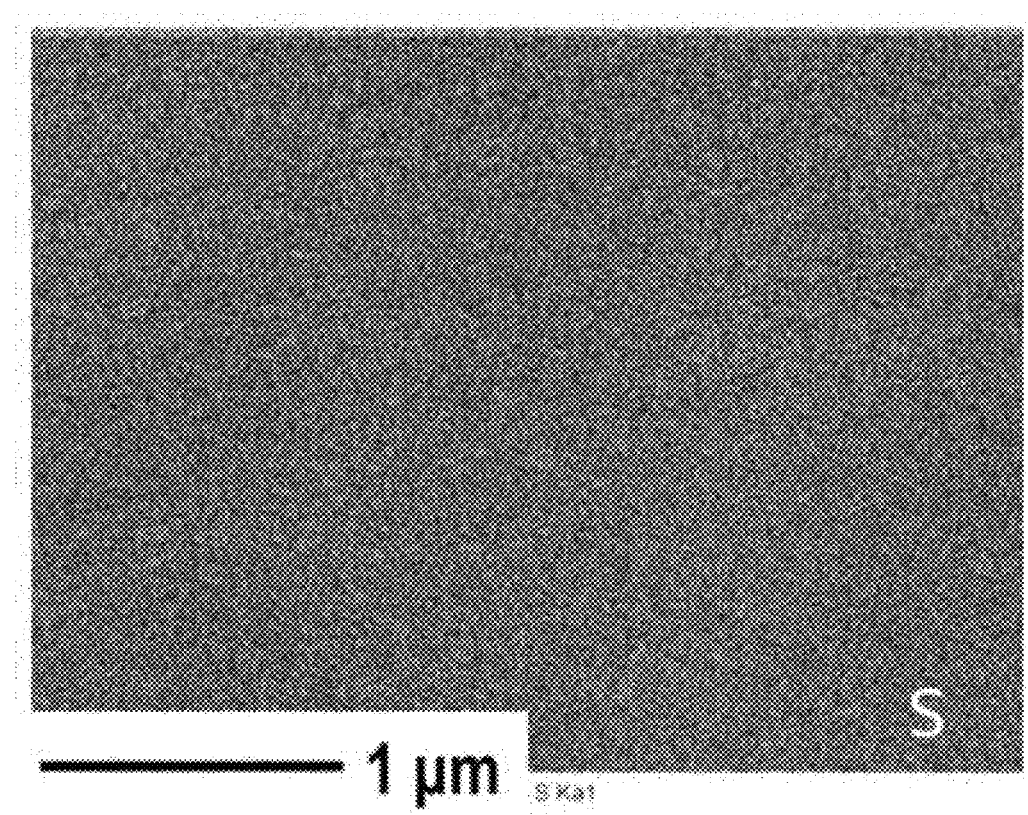

[Figure 14]
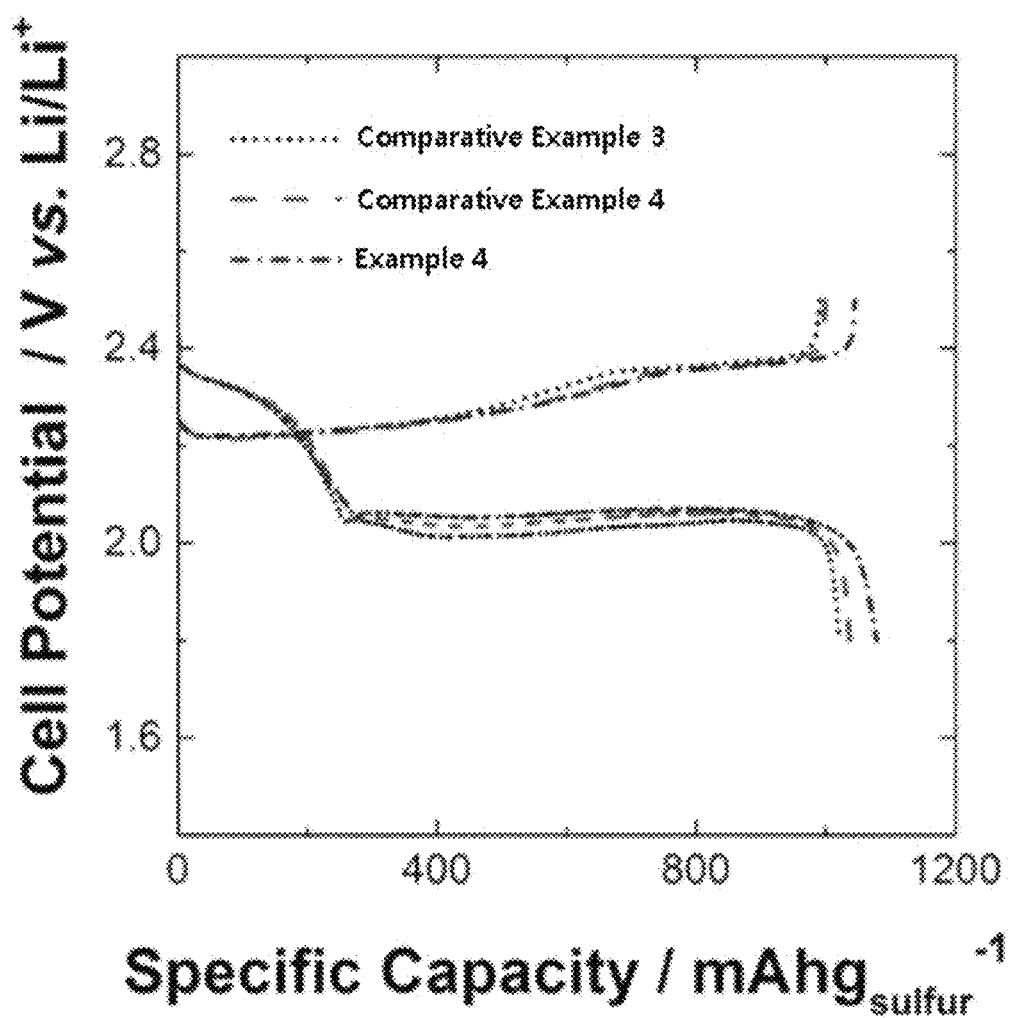

[Figure 15]
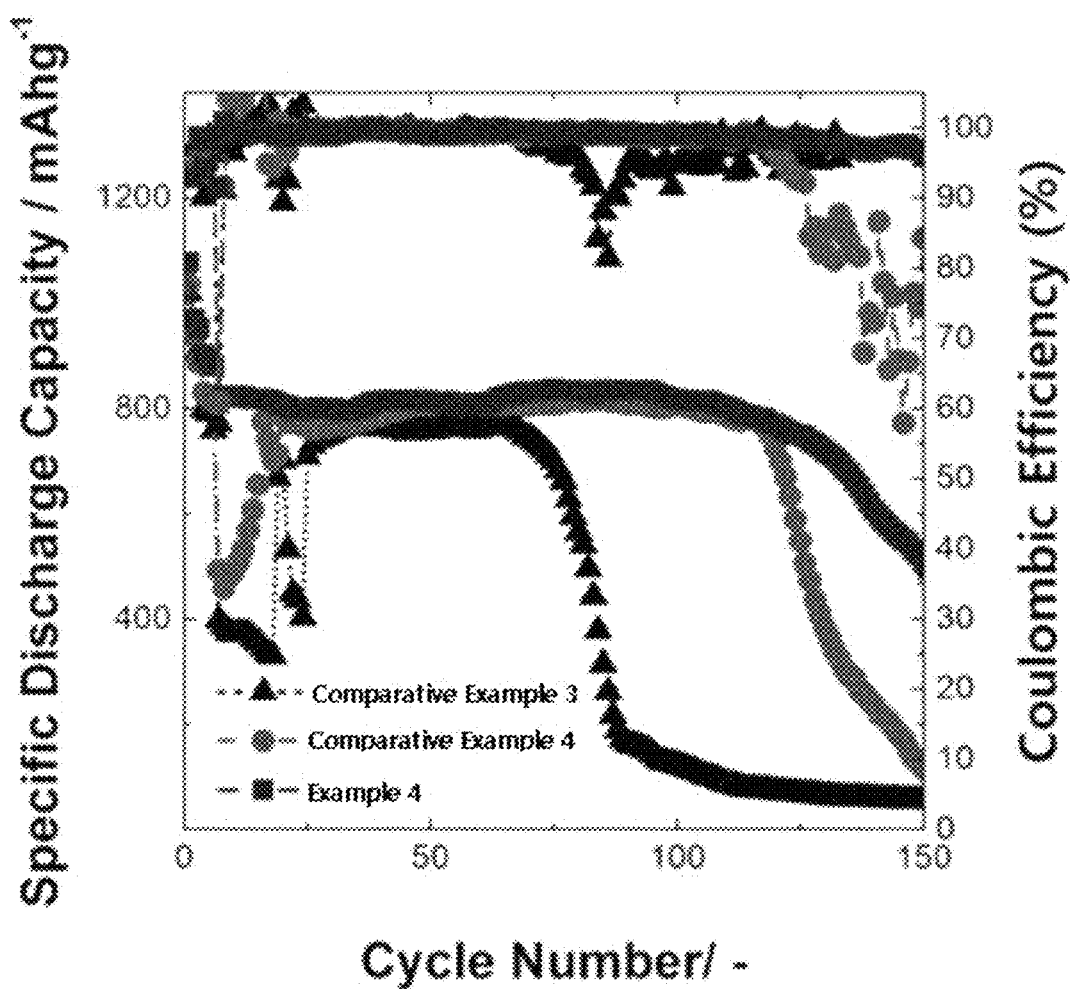

[Figure 16]
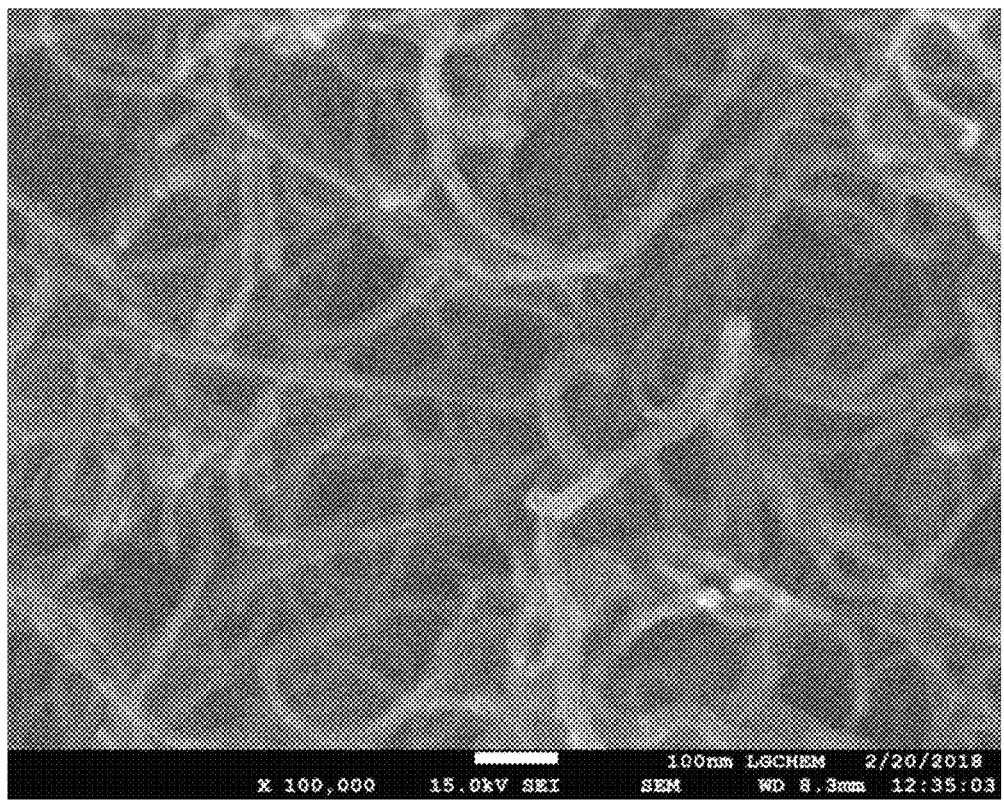

METHOD FOR PREPARING CARBON NANOSTRUCTURE COMPRISING MOLYBDENUM DISULFIDE, LITHIUM SECONDARY BATTERY CATHODE COMPRISING CARBON NANOSTRUCTURE COMPRISING MOLYBDENUM DISULFIDE, PREPARED THEREBY, AND LITHIUM SECONDARY BATTERY COMPRISING THE SAME

TECHNICAL FIELD

This application claims the benefits of priorities based on Korean Patent Application No. 10-2018-0102690, filed on Aug. 30, 2018 and Korean Patent Application No. 10-2018-0102699, filed on Aug. 30, 2018, the entire contents of which are incorporated herein by reference.

The present invention relates to a method for preparing a carbon nanostructure comprising molybdenum disulfide which can be applied as a positive electrode additive for a lithium secondary battery, a positive electrode for a lithium secondary battery which comprises the carbon nanostructure comprising molybdenum disulfide prepared therefrom as the positive electrode additive, and a lithium secondary battery with improved discharging characteristics having the same.

BACKGROUND ART

Secondary batteries have become important electronic components for portable electronic devices since the 1990s as an electric storage device capable of continuous charging and discharging unlike the primary battery which can only discharge once. In particular, since a lithium secondary battery was commercialized by Sony in Japan in 1992, it has led the information age as a key component of portable electronic devices such as smart phones, digital cameras, and notebook computers.

In recent years, lithium secondary batteries are rapidly growing in demand from electric sources of cleaner and power tool, medium-sized batteries to be used in fields such as electric bicycles and electric scooters, to large capacity batteries for applications such as electric vehicle (EV), hybrid electric vehicle (HEV), plug-in hybrid electric vehicle (PHEV), and various robots and electric power storage systems (ESS), while further widening application area.

However, the lithium secondary battery, which has the best characteristics among the secondary batteries known to date, has several problems in being actively used in transportation vehicles such as electric vehicles and PHEVs, and among them, the biggest problem is the limit in capacity.

The lithium secondary battery basically consists of materials such as positive electrode, electrolyte, and negative electrode. Among them, since the positive and negative electrode materials determine the capacity of the battery, the lithium secondary battery is limited in capacity due to the material limitations of positive and negative electrodes. In particular, since the secondary battery used in applications such as electric vehicles and PHEVs should be able to last as long as possible after charging once, the discharging capacity of the secondary battery is very important.

The limitation of the capacity of such a lithium secondary battery is difficult to be completely solved due to the structure and material constraints of the lithium secondary battery despite of much effort. Therefore, in order to fundamentally solve the problem of the capacity of the lithium secondary battery, it is required to develop a new concept secondary battery that goes beyond the existing secondary battery concept.

The lithium-sulfur secondary battery is a new high capacity and low-cost battery system which goes beyond capacity limits determined by the intercalation/deintercalation reaction of lithium ions to the layered structure of the metal oxide and graphite which is the basic principle of existing lithium secondary battery, and which can lead to replacement of transition metals and cost savings.

The lithium-sulfur secondary battery has a theoretical capacity of 1,675 mAh/g derived from a conversion reaction of lithium ion and sulfur ($S_8+16Li^++16e^-\rightarrow 8Li_2S$) in the positive electrode, and the negative electrode enables the battery system to have very high capacity using lithium metal (theoretical capacity: 3,860 mAh/g). Also, since the discharging voltage is about 2.2 V, the theoretical energy density is 2,600 Wh/kg based on the amount of the positive electrode and the negative electrode active material. These values are 6 to 7 times higher than the theoretical energy density of 400 Wh/kg of commercially available lithium secondary battery ($LiCoO_2$/graphite) which uses layered metal oxides and graphite.

After the lithium-sulfur secondary battery was found to be able to dramatically improve battery performance through the formation of nanocomposites around 2010, the lithium-sulfur secondary battery is attracting attention as a new high capacity, eco-friendly, low-cost lithium secondary battery and is currently being studied intensively around the world as a next-generation battery system.

One of the main problems of the lithium-sulfur secondary battery revealed to date is that since sulfur has an electrical conductivity of about $5.0\times 10^{-14}$ S/cm and thus is close to nonconductor, electrochemical reaction at the electrode is not easy, and due to the very large overvoltage, the actual discharging capacity and voltage are far below the theoretical value. Early researchers tried to improve the performance by methods such as mechanical ball milling of sulfur and carbon or surface coating with carbon, but there was no substantial effect.

In order to effectively solve the problem of limiting the electrochemical reaction by electrical conductivity, it is necessary to reduce the particle size to a size of several tens of nanometers or less and to conduct surface treatment with a conductive material, as in the example of $LiFePO_4$ (electrical conductivity: $10^{-9}$ to $10^{-10}$ S/cm) which is one of the other positive electrode active materials, and for this purpose, various chemical (melt impregnation into nano-sized porous carbon nanostructures or metal oxide structures) and physical (high energy ball milling) methods and the like have been reported.

Another major problem associated with the lithium-sulfur secondary battery is the dissolution of lithium polysulfide into the electrolyte, which is the intermediate product of sulfur generated during discharging. As the discharging is proceeded, sulfur ($S_8$) continuously reacts with lithium ions and thus the phases thereof are continuously changed into $S_8\rightarrow Li_2S_8\rightarrow(Li_2S_6)\rightarrow Li_2S_4\rightarrow Li_2S_2\rightarrow Li_2S$ or the like, and among them, $Li_2S_8$ and $Li_2S_4$ (lithium polysulfide), which are long chains of sulfur, are easily dissolved in a general electrolyte used in a lithium ion battery. When this reaction occurs, not only the reversible positive electrode capacity is greatly reduced but also the dissolved lithium polysulfide diffuses into the negative electrode and causes various side reactions.

In particular, lithium polysulfide causes a shuttle reaction especially during the charging process, and as a result, the charging capacity is continuously increased, and thus the charging/discharging efficiency is rapidly deteriorated. Recently, in order to solve such a problem, various methods have been proposed, which can be divided broadly into a method of improving the electrolyte, a method of improving the surface of a negative electrode, a method of improving the properties of a positive electrode and the like.

The method of improving the electrolyte is a method to suppress the shuttle reaction as much as possible by using new electrolytes, such as functional liquid electrolytes, polymer electrolytes, and ionic liquids, which have a novel composition, and thus inhibiting the dissolution of the polysulfide into the electrolyte or controlling the dispersion rate to the negative electrode through adjustment of the viscosity and the like.

Studies on controlling the shuttle reaction by improving the characteristics of solid-electrolyte interphase (SEI) formed on the surface of the negative electrode have been actively carried out. Typically, there is a method of adding an electrolyte additive such as $LiNO_3$ to form an oxide film of $Li_xNO_y$, $Li_xSO_y$ or the like on the surface of a lithium negative electrode, a method of forming a thick functional SEI layer on the surface of lithium metal, or the like.

Finally, as a method of improving the properties of the positive electrode, there are methods of forming a coating layer on the surface of the positive electrode particles to prevent the dissolution of the polysulfide, adding a porous material capable of capturing the dissolved polysulfide and so on. Typically, a method of coating the surface of a positive electrode structure containing a sulfur particle with a conductive polymer, a method of coating the surface of a positive electrode structure with a metal oxide on which lithium ions are transferred, a method of adding a porous metal oxide having a large specific surface area and a large pore size to a positive electrode, which is capable of absorbing a large amount of lithium polysulfide, a method of attaching a functional group capable of adsorbing lithium polysulfide onto the surface of a carbon structure, a method of wrapping sulfur particles using graphene or graphene oxide, or the like was proposed.

Although such efforts are under way, these methods are not only complicated, but also have a problem that the amount of sulfur that can be added, which is an active material, is limited. Therefore, it is necessary to develop new technologies to solve these problems and to improve the performance of lithium-sulfur battery.

DISCLOSURE

Technical Problem

In order to solve the above-mentioned problems, as a result of various studies on a positive electrode additive of a lithium-sulfur battery, the inventors of the present invention have confirmed that a carbon nanostructure comprising molybdenum disulfide with high purity can be selectively produced by mixing the molybdenum precursor, carbon nanostructure and sulfur and heat-treating them, while controlling the heat treatment temperature and process time, and thus have completed the present invention.

Therefore, it is an object of the present invention to provide a method for preparing a carbon nanostructure comprising molybdenum disulfide with high purity through a simple process, which is a positive electrode additive of a lithium-sulfur battery.

Also, in the present invention, as a result of introducing a carbon nanostructure comprising molybdenum disulfide to the positive electrode of the lithium secondary battery in order to solve the problem of the leaching of lithium polysulfides occurring on the side of the positive electrode of the lithium secondary battery and to suppress the side reaction with the electrolyte solution, it was confirmed that the battery performance of the lithium secondary battery can be improved by solving the above problem, and thus completed the present invention.

Therefore, it is another object of the present invention to provide a positive electrode additive for a lithium secondary battery that can solve the problem caused by the lithium polysulfides.

In addition, it is still another object of the present invention to provide a lithium secondary battery with improved lifetime characteristics which comprises the positive electrode as described above.

Technical Solution

In order to achieve the above objects, the present invention provides a method for preparing a carbon nanostructure comprising molybdenum disulfide, which comprises the steps of: (1) preparing a mixed solution by adding a carbon nanostructure to a solution comprising molybdenum precursor and a solvent; (2) drying the mixed solution to remove the solvent, and then mixing with the dried result with sulfur to melt and diffuse; and (3) heat-treating the molten and diffused mixture from step (2).

In addition, the present invention provides a positive electrode for a lithium secondary battery comprising an active material, an electrically conductive material, and a binder, wherein the positive electrode includes the carbon nanostructure comprising molybdenum disulfide ($MoS_2$).

In addition, the present invention provides a lithium secondary battery comprising a positive electrode, a negative electrode, a separator interposed therebetween, and an electrolyte, wherein the positive electrode is the positive electrode for the lithium secondary battery as described above.

Advantageous Effects

According to the present invention, there is an advantage that a carbon nanostructure comprising molybdenum disulfide with high purity can be selectively prepared by a simple process which comprises mixing molybdenum precursor, carbon nanostructure, and sulfur and heat-treating them, and the formation position of molybdenum disulfide in the carbon nanostructure can be controlled by the melt diffusion method.

In addition, if the carbon nanostructure comprising molybdenum disulfide according to the present invention is applied to the positive electrode of the lithium secondary battery, the lithium polysulfides generated during the charging and discharging of the lithium secondary battery are adsorbed, the reactivity of the lithium secondary battery positive electrode is increased, and side reactions with the electrolyte solution are suppressed.

In the case of the lithium secondary battery provided with the positive electrode comprising the carbon nanostructure comprising molybdenum disulfide, it is possible to realize a high capacity battery because the capacity of sulfur is not lowered and it is possible to stably apply sulfur with high loading, as well as the overvoltage of the battery is thereby improved, and there is no problem such as short or heat generation of the battery, thereby improving the battery stability. In addition, due to the morphological properties of the crystalline molybdenum disulfide well dispersed on the surface of the carbon nanostructure, the specific surface area is increased, and the electrochemical catalytic activity of the lithium secondary battery can be improved by imparting conductivity by the carbon nanostructure. In addition, the above lithium secondary battery has the advantages of high charging and discharging efficiency and improved lifetime characteristics of the battery.

DESCRIPTION OF DRAWINGS

FIGS. 1 and 2 are transmission electron microscopy (TEM) images of molybdenum disulfide ($MoS_2$) formed on the surface of a carbon nanotube (CNT) according to an example of the present invention.

FIG. 3 is a high-angle annular dark-field scanning transmission electron microscopy (HAADF-STEM) image of molybdenum disulfide ($MoS_2$) formed on the surface of a carbon nanotube (CNT) according to an example of the present invention.

FIG. 4 is an EDS mapping image of molybdenum disulfide ($MoS_2$) formed on the surface of a carbon nanotube (CNT) according to an example of the present invention.

FIG. 5 shows the results of TGA analysis of molybdenum disulfide ($MoS_2$) formed on the surface of a carbon nanotube (CNT) according to an embodiment of the present invention.

FIG. 6 shows the results of X-ray diffraction (XRD) analysis of molybdenum disulfide ($MoS_2$) formed on the surface of a carbon nanotube (CNT) according to an embodiment of the present invention.

FIG. 7 is a scanning electron microscopy (SEM) image of a carbon nanotube containing molybdenum disulfide according to an example of the present invention.

FIG. 8 is a scanning electron microscopy (SEM) image of a material prepared according to a comparative example of the present invention.

FIG. 9 is a molybdenum (Mo) mapping image of a material prepared according to a comparative example of the present invention.

FIG. 10 is a sulfur (S) mapping image of a material prepared according to a comparative example of the present invention.

FIG. 11 is a scanning electron microscopy (SEM) image of a material prepared according to a comparative example of the present invention.

FIG. 12 is a molybdenum (Mo) mapping image of a material prepared according to a comparative example of the present invention.

FIG. 13 is a sulfur (S) mapping image of a material prepared according to a comparative example of the present invention.

FIG. 14 is a graph showing the results of the measurement of the discharging capacity of lithium secondary batteries according to an example of the present invention and a comparative example.

FIG. 15 is a graph showing the results of the measurement of the lifetime characteristics of lithium secondary batteries according to an example of the present invention and a comparative example.

FIG. 16 is a scanning electron microscopy (SEM) image of a carbon nanotube comprising molybdenum disulfide according to an example of the present invention.

BEST MODE

Hereinafter, the present invention will be described in detail with reference to the accompanying drawings so that those skilled in the art can easily carry out the present invention. However, the present invention can be embodied in various different forms, and is not limited thereto.

The terms and words used in the present specification and claims should not be construed as limited to ordinary or dictionary terms, and should be construed in a sense and concept consistent with the technical idea of the present invention, based on the principle that the inventor can properly define the concept of a term to describe his invention in the best way possible.

The term "composite" as used herein refers to a material that two or more materials are combined to express a more effective function while forming physically and chemically different phases from each other.

The lithium secondary battery is manufactured by using a material capable of intercalating/deintercalating lithium ions as a negative electrode and a positive electrode, and filling an organic electrolyte solution or a polymer electrolyte solution between a negative electrode and a positive electrode, and means an electrochemical device that generates electrical energy by the oxidation/reduction reaction when lithium ions are intercalated and deintercalated at positive and negative electrodes. According to an embodiment of the present invention, the lithium secondary battery may be a lithium-sulfur battery comprising 'sulfur' as an electrode active material of a positive electrode.

Method for Preparing Carbon Nanostructure Comprising Molybdenum Disulfide

The method for preparing the carbon nanostructure comprising molybdenum disulfide may comprise the steps of: (1) preparing a mixed solution by adding a carbon nanostructure to a solution comprising molybdenum precursor, and a solvent, (2) drying the mixed solution to remove the solvent, and then mixing with the dried result sulfur to melt and diffuse, and (3) heat-treating the molten and diffused mixture from step (2).

The molybdenum precursor may be prepared in an aqueous solution by dissolving in an aqueous solvent, and preferably the molybdenum precursor may be dissolved in deionized water (DIW)) and then used.

The molybdenum precursor according to the present invention refers to a material capable of reacting with sulfur to form molybdenum disulfide ($MoS_2$), and preferably may be ammonium molybdate (($NH_4)_6Mo_7O_{24} \cdot 4H_2O$). Although molybdenum precursors vary in their types, when considering the solubility and heat treatment temperature of the aqueous solvent according to the present invention, since sodium molybdate ($Na_2MoO_4$) has a high melting point of 687° C., it may not be suitable for the preparation method according to the present invention. Since ammonium tetrathiomolybdate (($NH_4)_2MoS_4$) forms molybdenum disulfide ($MoS_2$) by pyrolysis itself in an inert gas atmosphere, it may not be suitable for the preparation method proposed in the present invention. In the case of molybdenum trioxide ($MoO_3$) and molybdenum chloride ($MoCl_5$), when following the preparation method according to the present invention, the molybdenum disulfide may not be located on the surface of the carbon nanostructure.

Non-limiting examples of the carbon nanostructure may be carbon nanotube, carbon nanofiber, carbon nanoribbon, carbon nanobelt, carbon nanorod, and graphene. Preferably, the carbon nanostructure may be a carbon nanotube (CNT), and may be a single-wall carbon nanotube, a multi-wall carbon nanotube or the like.

The carbon nanostructure according to the present invention may be a material coated with a dispersant on its surface. Since the molybdenum precursor can be selectively positioned on the surface of the carbon nanostructure by introducing a dispersant on the surface of the carbon nanostructure, the dispersant can determine the introduction position of the molybdenum disulfide desired in the present invention.

The kind of the dispersant is not particularly limited, but a known dispersant may be used. Specifically, the dispersant may be any one selected from polyacrylic acid (PAA), polyvinylpyrrolidone (PVP), and N-methyl-2-pyrrolidone (NMP), and a mixture thereof, and preferably may be polyvinylpyrrolidone (PVP).

Next, the mixed solution may be prepared by mixing a solution containing the carbon nanostructure and the molybdenum precursor, wherein the carbon nanostructure contains the dispersant of step (1) coated on its surface. The mixing can be done by methods known to those skilled in the art, non-limiting examples of which may be mortar mixing and the like.

Next, the step of removing the solvent by drying the mixed solution prepared in step (1) may be proceeded.

The drying may be carried out at 60 to 100° C., and preferably may be carried out at 70 to 80° C. In addition, the drying may be carried out for 3 to 12 hours in the above temperature range, and preferably for 6 to 8 hours.

In the case of the preparation method according to the present invention, as the moisture of the mixed solution of step (1) is evaporated through the drying process, the molybdenum precursor is located and grown on the surface of the carbon nanostructure. If the drying temperature is less than the above the drying temperature or the drying time is short, molybdenum precursor containing residual moisture may remain in a solvent other than the surface of the carbon nanostructure, and thus there may be a problem that molybdenum disulfide may be synthesized heterogeneously.

Ammonium molybdate $((NH_4)_6Mo_7O_{24} \cdot 4H_2O)$, which is a molybdenum precursor according to the present invention, is thermally decomposed to $(NH_4)_2O \cdot 2.5MoO_3$ at around 80 to 110° C., and is thermally decomposed to $(NH_4)_2 \cdot 4MoO_3$ at around 200° C. to finally form $MoO_3$. Therefore, if the drying temperature exceeds the above drying temperature or the drying time is long, there may be a problem that the aforementioned $MoO_3$ may not be located on the surface of the carbon nanostructure or may be generated outside the surface of the carbon nanostructure. Therefore, the drying temperature is suitably adjusted in the said range. The drying may be carried out by a method known to those skilled in the art, and may preferably be carried out using a convection oven in air.

The present invention may comprise a step of removing the solvent of the mixed solution to obtain a dry product in powder form comprising the molybdenum precursor and the carbon nanostructure and then a step of mixing the dry product with sulfur. The mixing can be carried out by methods known to those skilled in the art, non-limiting examples of which may be mortar-mixing and the like.

The mixing ratio of the dry mixture and sulfur may be a ratio such that a molar ratio of molybdenum (Mo) element contained in the dry mixture and sulfur (S) element is 1:8 or more. If the molar ratio of sulfur is less than the above range, the molybdenum disulfide $(MoS_2)$, which is prepared through the melt diffusion process and heat treatment process described later, may not be prepared due to insufficient sulfur content, or unwanted oxide may be prepared. Therefore, it is preferable to maintain the mixing ratio of sulfur of no less than the above range.

Next, the mixture of the dry mixture and sulfur may be subjected to the step of melt diffusion.

If the mixture of step (2) is subjected to hydrothermal synthesis rather than melt diffusion, sulfur may not be uniformly located on the surface of the carbon nanostructure containing molybdenum precursor. Therefore, in order for the molybdenum disulfide according to the present invention to be located at a specific position, preferably at the surface of the carbon nanostructure, it is preferable to subject it to the melt diffusion at a specific temperature condition.

FIG. 8 shows a scanning electron microscopy (SEM) image of carbon nanotubes containing molybdenum disulfide, which are prepared by mixing of carbon nanotubes, molybdenum precursors, and sulfur, and then hydrothermal synthesis in an autoclave rather than melt diffusion according to the invention. Referring to FIG. 8, it can be seen that the molybdenum disulfide is synthesized on the outside of the carbon nanotube in the form of irregular particles without forming a thin nano sheet on the surface of the carbon nanotube.

The melt diffusion of step (2) according to the present invention may be carried out at 140 to 160° C., preferably at 150 to 155° C. In addition, the melt diffusion may be carried out for 20 minutes to 1 hour in the temperature range, preferably 30 to 40 minutes. If the temperature of the melt diffusion is less than 140° C. or the heat treatment time is shorter than the above heat treatment time, sulfur may not be sufficiently melted and thus may not be uniformly positioned on the surface of the carbon nanostructure. In addition, if the temperature of the melt diffusion exceeds 160° C. or the heat treatment time is longer than the above heat treatment time, there may be a problem that the sulfur can be vaporized.

Next, the present invention may include a step of heat-treating the melt diffusion mixture which has undergone the melt diffusion process of step (2). Through the heat treatment process, molybdenum precursor and sulfur may react to form molybdenum disulfide $(MoS_2)$ on the surface of the carbon nanostructure. The heat treatment may be carried out at 400 to 600° C., and preferably may be carried out at 500 to 600° C. In one embodiment according to the present invention, the heating rate of the heat treatment may be controlled between the range of 5 to 20° C. per minute. If the heating rate exceeds 20° C./min, there are problems that the rate of vaporization of sulfur which is the reactant may be too high, thereby reducing the amount of sulfur reacting with the molybdenum precursor, and as a result, it can be prepared in the form of $MoS_{2-x}(0<x<2)$ rather than the desired molybdenum disulfide $(MoS_2)$. In addition, if the heating rate is less than 5° C./min, there may be a problem that the preparation time of the desired product may be too long. Therefore, the heating rate is appropriately adjusted within the above range.

In addition, the heat treatment may be performed in the above temperature range for 0.5 to 2 hours, preferably for 0.5 to 1 hour. If the heat treatment temperature is less than 400° C. or the heat treatment time is shorter than the above heat treatment time, the molybdenum precursor and sulfur may not sufficiently react to produce the desired molybdenum disulfide. In addition, if the heat treatment temperature exceeds 600° C. or the heat treatment time is longer than the heat treatment time, the particle size of the resulting molybdenum disulfide may be increased or may be expressed in the form of agglomerates rather than nano sheet on the surface of the carbon nanostructure, and unlike the desired molybdenum disulfide, unnecessary oxides may be produced. Accordingly, it may be difficult to synthesize molybdenum disulfide of the desired physical properties according to the present invention. Therefore, the temperature and time are appropriately adjusted within the temperature and time of the said range.

The heat treatment of step (3) may be performed in an inert gas atmosphere. The heat treatment may be performed (i) under an inert gas atmosphere in which a gas inside the reactor is replaced with an inert gas, or (ii) in a state in which the inert gas is continuously introduced to continuously replace the gas in the reactor. In the case of step (ii), for example, the flow rate of the inert gas may be 1 to 500 mL/min, specifically 10 to 200 mL/min, more specifically 50 to 100 mL/min.

Here, the inert gas may be selected from the group consisting of nitrogen, argon, helium, and mixtures thereof, and preferably nitrogen may be used.

The molybdenum disulfide according to an embodiment of the present invention may be formed on the surface of the carbon nanostructure, and may be in the form of a nano sheet having a thickness of 1 to 10 nm, preferably 1 to 5 nm, more preferably 1 to 2 nm. As the thickness of molybdenum disulfide decreases within the above range, the lithium polysulfides leached during charging and discharging of the lithium-sulfur battery can be effectively adsorbed, and thus it is suitable as a positive electrode material of lithium-sulfur battery, and does not interfere with conductivity of carbon nanostructure, thereby improving the performance of the battery. However, if molybdenum disulfide is less than 1 nm, the catalytic activity of molybdenum disulfide may be lowered, and thus the adsorption effect of polysulfide may be reduced. If molybdenum disulfide exceeds 10 nm, it may interfere with conductivity by carbon nanostructure. Therefore, the thickness of molybdenum disulfide is properly adjusted within the above range.

The carbon nanostructure comprising molybdenum disulfide ($MoS_2$) prepared by the above method may be crystalline.

FIG. 6 shows the results of X-ray diffraction analysis (XRD) data of the carbon nanostructure containing crystalline molybdenum disulfide ($MoS_2$) prepared by the above method. As a result of X-ray diffraction analysis using CuKα rays of FIG. 6, XRD peaks of (002), (100), and (110) planes were found at 2θ=13.5±0.2°, 32.8±0.2° and 58.5±0.2°, respectively ($MoS_2$), XRD peaks of the (002) and (100) planes were found at 2θ=25.3±0.2° and 42.9±0.2°, respectively (CNT). Through detection of the effective peak of FIG. 6, it can be confirmed that the carbon nanostructure comprising molybdenum disulfide ($MoS_2$) according to the present invention is synthesized.

A significant or effective peak in X-ray diffraction analysis (XRD) refers to a peak that is repeatedly detected in the substantially same pattern in the XRD data without being greatly influenced by the analysis conditions or the performer of the analysis, and in other words, refers to a peak having a height, intensity, strength, or the like of 1.5 times or more, preferably 2 times or more, more preferably 2.5 times or more relative to the background level.

Positive Electrode for Lithium Secondary Battery

The present invention also provides a positive electrode for a lithium secondary battery, which has been improved in the problems of continuous deterioration of the reactivity of the electrode and the reduction of discharging capacity due to the dissolution and shuttle phenomenon of lithium polysulfide by compensating the disadvantages of the positive electrode for a conventional lithium secondary battery.

In particular, in the present invention, the carbon nanostructure comprising molybdenum disulfide ($MoS_2$) may be comprised in the positive electrode of the lithium secondary battery to adsorb lithium polysulfides, thereby reducing the problem of reducing the lifetime of the lithium secondary battery caused by the delivery of the lithium polysulfides to the negative electrode, and to suppress the reduced reactivity due to lithium polysulfide, thereby increasing the discharging capacity of the lithium secondary battery comprising the positive electrode, and improving the lifetime of the battery.

The present invention provides a positive electrode for a lithium secondary battery comprising an active material, an electrically conductive material, and a binder, wherein the positive electrode comprises a carbon nanostructure comprising molybdenum disulfide ($MoS_2$) prepared through the above preparation method as a positive electrode additive.

In this case, the positive electrode of the lithium secondary battery may include a current collector and an electrode active material layer formed on at least one surface of the current collector, and the electrode active material layer may comprise base solids containing an active material, an electrically conductive material, and a binder.

As the current collector, it may be preferable to use aluminum, nickel, or the like having excellent electrical conductivity.

In one embodiment, the carbon nanostructure comprising molybdenum disulfide ($MoS_2$) may be included in an amount of 0.1 to 15 parts by weight, specifically 1 to 15 parts by weight, preferably 5 to 10 parts by weight, based on 100 parts by weight of the base solids comprising the active material, the electrically conductive material, and the binder. If the amount of the carbon nanostructure is less than the lower limit of the numerical range, the adsorption effect on the polysulfide may be insignificant, and if the amount exceeds the upper limit, the capacity of the electrode decreases, which is not preferable. The carbon nanostructure comprising molybdenum disulfide ($MoS_2$) may be a carbon nanostructure comprising molybdenum disulfide ($MoS_2$) prepared by the method of the present invention.

In the carbon nanostructure comprising molybdenum disulfide ($MoS_2$) according to the present invention, the molybdenum disulfide may be located on the surface of the carbon nanostructure. According to the preparation method, since the formation position of the molybdenum precursor can be controlled by introducing a dispersant to the surface of the carbon nanostructure, the molybdenum disulfide may be introduced to the surface of the carbon nanostructure through heat treatment with sulfur. In this case, the molybdenum disulfide may be formed to a thickness of 1 to 10 nm. If the thickness is less than 1 nm, the catalytic activity of molybdenum disulfide is lowered, so that the adsorption effect on the polysulfide may be reduced. If the thickness exceeds 10 nm, conductivity by the carbon nanostructure may be disturbed. Therefore, the thickness is appropriately adjusted within the above range.

Based on 100 parts by weight of the total carbon nanostructure comprising molybdenum disulfide ($MoS_2$) according to the present invention, molybdenum disulfide may be contained in an amount of 10 to 50 parts by weight. According to the preparation method, there is an advantage that the content of molybdenum disulfide can be easily controlled by controlling the ratio of molybdenum precursor and sulfur. However, if the content of molybdenum disulfide contained in the carbon nanostructure is less than 10 parts by weight, the catalytic activity effect on the adsorption of lithium polysulfide and the reduction of polysulfide by molybdenum disulfide may be reduced, and if the content of molybdenum disulfide exceeds 50 parts by weight, molybdenum disulfide formed by the preparation method may be synthesized to the outside, thereby not forming a thin and uniform coating layer on the surface of the carbon nanostructure.

On the other hand, the active material of the base solids constituting the positive electrode of the present invention may comprise elemental sulfur ($S_8$), a sulfur-based compound, or a mixture thereof. The sulfur-based compound may be selected from the group consisting of $Li_2S_n$ (n≥1), an organic sulfur compound and a carbon-sulfur composite [$(C_2S_x)_n$: x=2.5 to 50, n≥2].

The positive electrode for a lithium secondary battery according to the present invention may preferably comprise an active material of a sulfur-carbon composite, and since the sulfur material alone is not electrically conductive, it can be used in combination with an electrically conductive material. The addition of the carbon nanostructure comprising molybdenum disulfide ($MoS_2$) according to the present invention does not affect the structure maintenance of the sulfur-carbon composite and has an advantage of electrochemical catalytic activity and conductivity enhancement by imparting conductivity by the carbon nanostructure.

In one embodiment, the carbon-sulfur composite may contain 60 to 80 parts by weight of sulfur, preferably 70 to 75 parts by weight of sulfur, based on 100 parts by weight of the carbon-sulfur composite. If the content of sulfur is less than 60 parts by weight, the content of the carbon material in the carbon-sulfur composite is relatively increased. As the content of the carbon is increased, the specific surface area is increased and thus when preparing the slurry, the amount of binder added should be increased. Such an increase in the additive amount of the binder may eventually increase the sheet resistance of the electrode, and may act as an insulator to prevent electron pass, thereby deteriorating the battery performance. If the content of sulfur exceeds 80 parts by weight, the sulfur or sulfur compounds not bound to the carbon material may be aggregated with each other or re-leached on the surface of the carbon material, and it may be difficult to directly participate in the electrode reaction because it is difficult to receive electrons. Therefore, the amount of sulfur contained is appropriately controlled within the above range.

The carbon in the carbon-sulfur composite according to the present invention has a porous structure or a high specific surface area, and thus any carbon material conventionally used in the art may be used. For example, the porous carbon material may be, but is not limited to, at least one selected from the group consisting of graphite; graphene; carbon black such as Denka black, acetylene black, Ketjen black, channel black, furnace black, lamp black, and thermal black; carbon nanotube (CNT) such as single-wall carbon nanotube (SWCNT) and multi-wall carbon nanotube (MWCNT); carbon fibers such as graphite nanofiber (GNF), carbon nanofiber (CNF), and activated carbon fiber (ACF); and activated carbon. Also, the porous carbon material may be in the form of spherical, rod-shaped, acicular, plate-like, tubular or bulky, and may be used without limitation as long as it is commonly used in lithium-sulfur batteries.

The active material may be preferably used in an amount of 50 to 95 parts by weight, more preferably about 70 parts by weight, based on 100 parts by weight of the base solids. If the active material is comprised in an amount less than the above range, the reaction of the electrode is difficult to be sufficiently exerted. Even if the active material is comprised in an amount more than the above range, the content of other conductive materials and binders is relatively insufficient and it is difficult to exhibit sufficient electrode reaction. Therefore, it is preferable to determine an appropriate content within the above range.

Among the base solids constituting the positive electrode of the present invention, the electrically conductive material is a material that electrically connects an electrolyte to a positive electrode active material and serves as a path through which electrons move from the current collector to the sulfur, and is not particularly limited as long as it has porosity and conductivity without causing chemical changes in the battery. For example, graphite-based materials such as KS6; carbon blacks such as Super P, carbon black, Denka black, acetylene black, Ketjen black, channel black, furnace black, lamp black, and thermal black; carbon derivatives such as fullerene; conductive fibers such as carbon fiber and metal fiber; carbon fluoride; metal powders such as aluminum and nickel powder; or conductive polymers such as polyaniline, polythiofene, polyacetylene, and polypyrrole can be used alone or in combination.

The electrically conductive material may be preferably used in an amount of 1 to 10 parts by weight, preferably about 5 parts by weight, based on 100 parts by weight of base solids. If the content of the electrically conductive material contained in the electrode is less than the above range, the unreacted portion of the sulfur in the electrode is increased and eventually the capacity is reduced. If the content exceeds the above range, the high efficiency discharging characteristic and the charging/discharging cycle lifetime are adversely affected. Therefore, it is desirable to determine the appropriate content within the above-mentioned range.

The binder as the base solids is a material that is comprised to cause a slurry composition of the base solids that forms a positive electrode to adhere well to the current collector, which is a substance which is well dissolved in a solvent and which can well constitute a conductive network between a positive electrode active material and a conductive material. Unless otherwise specified, all binders known in the art can be used, and preferably poly(vinyl)acetate, polyvinyl alcohol, polyethylene oxide, polyvinyl pyrrolidone, alkylated polyethylene oxide, cross-linked polyethylene oxide, polyvinyl ether, poly(methyl methacrylate), polyvinylidene fluoride (PVdF), polyhexafluoropropylene, copolymer (product name: Kynar) of polyvinylidene fluoride, poly(ethyl acrylate), polyvinylchloride, polytetrafluoroethylene, polyacrylonitrile, polyvinylpyridine, polystyrene, carboxy methyl cellulose, siloxane-based binder such as polydimethylsiloxane, rubber-based binder comprising styrene-butadiene rubber, acrylonitrile-butadiene rubber, and styrene-isoprene rubber, ethyleneglycol-based binder such as polyethylene glycol diacrylate and derivatives thereof, blends thereof, and copolymers thereof may be used, but the present invention is not limited thereto.

The binder may be used in an amount of 1 to 10 parts by weight, preferably about 5 parts by weight, based on 100 parts by weight of the base composition contained in the electrode. If the content of the binder resin is less than the above range, the physical properties of the positive electrode are degraded, and thus the positive electrode active material and the electrically conductive material can be dropped off. If the content of the binder resin exceeds the above range, the ratio of the active material and the conductive material in the positive electrode may be relatively decreased, thereby reducing the battery capacity. Therefore, it is preferable that the content of the binder resin is appropriately determined within the above-mentioned range.

As described above, the positive electrode comprising the carbon nanostructure comprising molybdenum disulfide ($MoS_2$) and the base solids can be prepared by conventional methods. For example, to a positive electrode active material, a solvent, and if necessary, a binder, a conductive material, and a dispersant were mixed and stirred to prepare a slurry. Then, the prepared slurry can be applied (coated) on a current collector of a metal material, compressed and then dried to produce a positive electrode.

For example, in preparing the positive electrode slurry, first, after the carbon nanostructure comprising molybdenum disulfide ($MoS_2$) is dispersed in a solvent, the obtained dispersion is mixed with the active material, the electrically conductive material, and the binder to obtain a slurry composition for forming a positive electrode. Thereafter, this slurry composition is coated on a current collector and dried to complete a positive electrode. At this time, if necessary, the electrode can be manufactured by compression-molding on the current collector to improve the density of the electrode. There are no limitations on the method of coating the slurry. For example, it is possible to use a coating method such as doctor blade coating, dip coating, gravure coating, slit die coating, spin coating, comma coating, bar coating, reverse roll coating, screen coating, cap coating and the like.

At this time, a solvent capable of not only uniformly dispersing a positive electrode active material, a binder, and a conductive material, but also easily dispersing the carbon nanostructure comprising molybdenum disulfide ($MoS_2$) can be used as the solvent. As such a solvent, water is most preferable as an aqueous solvent. At this time, water may be a secondary distilled water (DW) or a tertiary distilled water (DIW: deionized water), but is not necessarily limited thereto, and if necessary, a lower alcohol which can be easily mixed with water may be used. Examples of the lower alcohol comprise methanol, ethanol, propanol, isopropanol, and butanol, and they may be preferably used in mixture with water.

Lithium Secondary Battery

Meanwhile, the present invention provides a lithium secondary battery comprising a positive electrode, a negative electrode, a separator interposed therebetween, and an electrolyte, wherein the positive electrode is the positive electrode as described above.

At this time, the negative electrode, separator, and electrolyte may be composed of conventional materials that can be used in a lithium secondary battery.

Specifically, the negative electrode may comprise a material capable of reversibly intercalating or deintercalating lithium ion ($Li^+$), a material capable of reacting with lithium ion to reversibly form a lithium-containing compound, lithium metal, or a lithium alloy as an active material.

The material capable of reversibly intercalating or deintercalating lithium ion ($Li^+$) may be, for example, crystalline carbon, amorphous carbon, or mixtures thereof. In addition, the material capable of reacting with lithium ion ($Li^+$) to reversibly form the lithium-containing compound may be, for example, tin oxide, titanium nitrate, or silicon. In addition, the lithium alloy may be, for example, an alloy of lithium and the metal selected from the group consisting of Na, K, Rb, Cs, Fr, Be, Mg, Ca, Sr, Ba, Ra, Al, and Sn.

In addition, the negative electrode may further optionally comprise a binder together with a negative electrode active material. The binder acts to cause negative electrode active materials to become a paste and create mutual adhesion between the active materials, adhesion between the active materials and the current collector, and buffer effect for the expansion and contraction of the active materials, etc. Specifically, the binder is the same as that described above.

In addition, the negative electrode may further comprise a current collector for supporting a negative electrode active layer comprising a negative electrode active material and a binder. The current collector may be selected from the group consisting of copper, aluminum, stainless steel, titanium, silver, palladium, nickel, alloys thereof, and combinations thereof. The stainless steel may be surface-treated with carbon, nickel, titanium, or silver, and an aluminum-cadmium alloy may be used as the alloy. In addition, sintered carbon, a nonconductive polymer surface-treated with a conductive material, or a conductive polymer may be used.

In addition, the negative electrode may be a thin film of lithium metal.

As the separator, a material capable of separating or insulating the positive electrode and the negative electrode from each other while allowing the lithium ion to be transported therebetween is used. The separator can be used as a separator without any particular limitations as long as it is used as a separator in the lithium secondary battery. Particularly, it is desirable to use a separator having excellent wettability to the electrolyte while having low resistance to ion migration of the electrolyte.

More preferably, as the material for the separator, a porous, nonconductive, or insulating material can be used, and for example, the separator may be an independent member such as a film, or may be a coating layer added to the positive and/or negative electrodes.

Specifically, a porous polymer film, for example, a porous polymer film made of a polyolefin-based polymer such as ethylene homopolymer, propylene homopolymer, ethylene/butene copolymer, ethylene/hexene copolymer and ethylene/methacrylate copolymer, etc. may be used alone or in a laminate thereof, or a conventional porous nonwoven fabric, for example, a nonwoven fabric made of glass fiber, polyethyleneterephthalate fiber or the like with high melting point can be used, but are not limited thereto.

The electrolyte is a non-aqueous electrolyte containing lithium salt and is composed of lithium salt and an electrolyte solution, and as the electrolyte solution, non-aqueous organic solvent, organic solid electrolyte, and inorganic solid electrolyte are used.

The lithium salt is a substance which can be easily dissolved in a non-aqueous organic solvent, and for example, may be at least one selected from the group consisting of LiCl, LiBr, LiI, $LiClO_4$, $LiBF_4$, $LiB_{10}Cl_{10}$, $LiB(Ph)_4$, $LiPF_6$, $LiCF_3SO_3$, $LiCF_3CO_2$, $LiAsF_6$, $LiSbF_6$, $LiAlCl_4$, $LiSO_3CH_3$, $LiSO_3CF_3$, LiSCN, $LiC(CF_3SO_2)_3$, $LiN(CF_3SO_2)_2$, lithium chloroborane, lithium lower aliphatic carboxylate, and lithium imide.

The concentration of the lithium salt may be 0.2 to 2 M, preferably 0.6 to 2 M, more preferably 0.7 to 1.7 M depending on various factors such as the exact composition of the electrolyte mixture, the solubility of the salt, the conductivity of the dissolved salt, the charging and discharging conditions of the battery, the operating temperature and other factors known in the lithium battery field. If the concentration of the lithium salt is less than the above range, the conductivity of the electrolyte may be lowered and thus the performance of the electrolyte may be deteriorated. If the concentration of the lithium salt exceeds the above range, the viscosity of the electrolyte may increase and thus the mobility of the lithium ion ($Li^+$) may be reduced. Accordingly, it is preferable to select an appropriate concentration of the lithium salt within the above range.

The non-aqueous organic solvent is a substance capable of dissolving a lithium salt well, and preferably, aprotic organic solvents such as 1,2-dimethoxyethane, 1,2-diethoxyethane, 1,2-dibutoxyethane, dioxolane (DOL), 1,4-dioxane, tetrahydrofuran, 2-methyltetrahydrofuran, dimethylcarbonate (DMC), diethylcarbonate (DEC), ethylmethylcarbonate (EMC), methylpropylcarbonate (MPC), ethylpropylcarbonate, dipropylcarbonate, butylethylcarbonate, ethylpropanoate (EP), toluene, xylene, dimethyl ether (DME), diethylether, triethylene glycol monomethyl ether (TEGME), diglyme, tetraglyme, hexamethyl phosphoric triamide, gamma-butyrolactone (GBL), acetonitrile, propionitrile, ethylenecarbonate (EC), propylenecarbonate (PC), N-methylpyrrolidone, 3-methyl-2-oxazolidone, acetic acid ester, butyric acid ester and propionic acid ester, dimethyl formamide, sulfolane (SL), methyl sulfolane, dimethyl acetamide, dimethyl sulfoxide, dimethyl sulfate, ethyleneglycol di-acetate, dimethyl sulfite, or ethyleneglycol sulfite can be used alone or in a mixed solvent form of two or more solvents thereof.

As the organic solid electrolyte, preferably, polyethylene derivatives, polyethylene oxide derivatives, polypropylene oxide derivatives, phosphate ester polymers, polyalginate lysine, polyester sulfide, polyvinyl alcohol, polyvinylidene fluoride, and polymers comprising ionic dissociation groups and the like can be used.

As the inorganic solid electrolyte of the present invention, preferably, nitrides, halides, sulfates and the like of Li such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, $Li_3PO_4$-$Li_2S$—$SiS_2$ may be used.

The shape of the lithium secondary battery as described above is not particularly limited and may be, for example, a jelly-roll type, a stack type, a stack-folding type (including a stack-Z-folding type), or a lamination-stacking type, and preferably a stack-folding type.

An electrode assembly in which the positive electrode as described above, the separator, and the negative electrode are successively laminated is manufactured and then placed it in a battery case. Thereafter, a lithium secondary battery is manufactured by injecting an electrolyte solution into the upper part of the case and sealing it with a cap plate and a gasket.

The lithium secondary battery may be classified into a cylindrical shape, a square shape, a coin shape, a pouch shape, and the like depending on the shape, and may be divided into a bulk type and a thin film type depending on the size. The structure and manufacturing method of these batteries are well known in the art, and thus detailed description thereof will be omitted.

The lithium secondary battery according to the present invention constituted as described above comprises the carbon nanostructure comprising molybdenum disulfide ($MoS_2$) to adsorb the lithium polysulfide generated during charging and discharging of the lithium-sulfur battery, thereby increasing the reactivity of the positive electrode of the lithium secondary battery, and thus the lithium secondary battery to which the positive electrode is applied has the effect of increasing discharging capacity and lifetime.

Hereinafter, the present invention will be described in more detail with reference to examples and the like. However, the scope and content of the present invention cannot be construed as narrowing down or limiting the invention by the examples and the like. Also, it will be apparent on the basis of the disclosures of the present invention, comprising the following examples that the present invention, in which experimental results are not specifically shown, can be easily carried out by those skilled in the art and that such modifications and variations are intended to fall within the scope of the appended claims.

Example 1: Preparation of Carbon Nanostructure Comprising Molybdenum Disulfide As a solution of the molybdenum precursor, 0.4 g of ammonium molybdate (($NH_4)_6Mo_7O_{24}·4H_2O$) (Junsei Chemical Company) was dissolved in deionized water (DIW) to prepare a 8.1 mM aqueous solution. Subsequently, 2 g of carbon nanotube (CNT) was added to a solution of polypersylpyrrolidone (PVP, Zhangzhou Huafu Chemical Company) as a dispersant to prepare a carbon nanotube coated with PVP on its surface. The PVP-coated CNT was added to the aqueous solution of ammonium molybdate and then mortar-mixed for 10 minutes (or hours).

The mixed solution was dried at 80° C. for 6 hours in a convection oven to completely evaporate the solvent and thus obtain a black dried powder. 2.6 g of dried powder and 0.6 g of sulfur (Mo:S=1:8 molar ratio) were mortar mixed for 10 minutes (or hours). Thereafter, the sulfur mixture was melt diffused in a convection oven at 155° C. for 30 minutes to obtain a sulfur-supported powder.

The melt-diffused powder was heat-treated at 600° C. for 1 hour while flowing argon gas at a flow rate of 100 mL/min. At this time, the heating rate for the heat treatment was 10° C. per minute. Through the heat treatment, a carbon nanotube which carries 12 wt. % of molybdenum disulfide on its surface based on the total product was prepared.

Example 2: Preparation of Carbon Nanostructure Comprising Molybdenum Disulfide A carbon nanotube having molybdenum disulfide on its surface was prepared in the same manner as in Example 1, except that a 19.1 mM aqueous solution of molybdenum precursor and 1.4 g of sulfur were added so that 30 wt. % of molybdenum disulfide based on the total product was carried on the surface.

Example 3: Preparation of Carbon Nanostructure Comprising Molybdenum Disulfide A carbon nanotube having molybdenum disulfide on its surface was prepared in the same manner as in Example 1, except that a 55 mM aqueous solution of molybdenum precursor and 3.9 g of sulfur were added so that 53 wt. % of molybdenum disulfide based on the total product was carried on the surface.

Comparative Example 1: Preparation of Carbon Nanostructure Comprising Molybdenum Disulfide As a solution of the molybdenum precursor, 0.4 g of ammonium molybdate (($NH_4)_6Mo_7O_{24}·4H_2O$) (Junsei Chemical Company) was dissolved in deionized water (DIW) to prepare a 8.1 mM aqueous solution. Subsequently, 2 g of carbon nanotube (CNT) was added to a solution of polypersylpyrrolidone (PVP, Zhangzhou Huafu Chemical Company) as a dispersant to prepare a carbon nanotube coated with PVP on its surface. The PVP-coated CNT was added to the aqueous solution of ammonium molybdate and then mortar-mixed for 10 minutes.

The mixed solution was dried at 80° C. for 6 hours in a convection oven to completely evaporate the solvent and thus obtain a black dried powder. 2.6 g of dried powder and 0.67 g of thiourea (Mo:S=1:4 molar ratio) as a raw material of sulfur were mixed along with 80 ml of distilled water, and then stirred for 30 minutes.

The sulfur mixture was placed in a 100 ml autoclave of stainless material, and hydrothermal synthesis was performed at 220° C. for 18 hours. Thereafter, the hydrothermally synthesized precipitate was slowly cooled to room temperature, washed with 1 mM sodium hydroxide solution and distilled water, and dried by completely evaporating the solvent in a vacuum oven to prepare a carbon nanotube comprising molybdenum disulfide.

Comparative Example 2: Preparation of Carbon Nanostructure Comprising Molybdenum Disulfide A carbon nanotube comprising molybdenum disulfide was prepared in the same manner as in Comparative Example 1, except that the CNT is used without adding to the solution of polyvinylpyrrolidone (PVP) which is a dispersant.

Experimental Example 1: Transmission Electron Microscopy (TEM) and Scanning Electron Microscopy (SEM) Analysis For carbon nanotubes including molybdenum disulfide prepared in Examples 1 to 3, Comparative Examples 1 and 2, TEM analysis (TITAN G2 60-300 ChemiSTEM, FEI Company) and SEM analysis (JSM-7601F, JEOL Company) were performed and the results are shown in FIGS. 1, 2, 7, 8, 11, and 16. Example 1 relates to FIGS. 1 and 2, Example 2 to FIG. 16, Example 3 to FIG. 7, Comparative Example 1 to FIG. 8, and Comparative Example 2 to FIG. 11, respectively.

Referring to FIGS. 1 and 2, as a result of TEM analysis for Example 1 with a magnification of 100 k, it was confirmed that molybdenum disulfide having a thickness of 1 to 2 nm was formed very thinly in the form of a nano sheet on the surface of the carbon nanotube.

Referring to FIG. 16, in the case of Example 2 containing 30 wt. % of molybdenum disulfide, it was confirmed that molybdenum disulfide was synthesized on the surface of the carbon nanotube.

Referring to FIG. 7, in the case of Example 3 containing 53 wt. % of molybdenum disulfide, it was confirmed that molybdenum disulfide is synthesized outside the carbon nanotube, not on the surface of the carbon nanotube.

FIG. 8 is a result of SEM analysis relating to Comparative Example 1, and through this, it was confirmed that molybdenum disulfide is formed outside the carbon nanotube, not on the surface of the carbon nanotube, and in the shape of irregular particles, not in the shape of nanosheets.

FIG. 11 is a result of SEM analysis relating to Comparative Example 2, through this, it was confirmed that molybdenum disulfide is synthesized in the shape of nanosheets, but outside the carbon nanotube, not on the surface of the carbon nanotube.

Experimental Example 2: High-Angle Annular Dark Field Scanning Transmission Electron Microscopy (HAADF-STEM) and Energy Dispersive Spectroscopy (EDS) Mapping HAADF-STEM (Tiatan cubed G2 60-300, FEI Company) for the carbon nanotube containing molybdenum disulfide of Example 1 was measured and the results are shown in FIG. 3. The advantage of this analysis is that atoms with higher atomic numbers are observed brighter. The element to be observed can be identified using these features. Carbon with atomic number 6 which is the constituent element of the carbon nanotube was darkly observed, and molybdenum with atomic number 42 was brightly observed. Through this, it was confirmed that molybdenum disulfide was well dispersed and formed on the surface of the carbon nanotube.

FIG. 4 shows the results of the EDS mapping for the STEM image. According to FIG. 4, it can be seen that the elemental sulfur is evenly distributed on the surface of the carbon nanotube, and through this, it can be considered that molybdenum disulfide was formed as a uniform coating layer on the surface of the carbon nanotube.

FIGS. 9 and 10 show images of EDS mapping according to Comparative Example 1. FIG. 9 shows an image of molybdenum (Mo) mapping, and FIG. 10 shows an image of sulfur (S) mapping, respectively. Referring to FIGS. 9 and 10, in the case of molybdenum disulfide prepared according to Comparative Example 1, it was confirmed from the distribution images of molybdenum and sulfur that molybdenum disulfide is formed in the shape of irregular particles.

FIGS. 12 and 13 show images of EDS mapping according to Comparative Example 2. FIG. 12 shows an image of molybdenum (Mo) mapping, and FIG. 13 shows an image of sulfur (S) mapping, respectively. In the case of molybdenum disulfide prepared according to Comparative Example 2, the molybdenum disulfide was synthesized outside the surface of the carbon nanotube, not on the surface thereof, and thus the distribution of molybdenum disulfide could not be confirmed from the distribution images of molybdenum and sulfur of FIGS. 12 and 13.

Experimental Example 3: Thermogravimetric Analysis

Thermogravimetric Analysis (TGA) is a method of measuring and analyzing the change in weight of a sample with temperature changes when the sample is heated to a given temperature condition. This experiment was carried out for the carbon nanotube containing molybdenum disulfide prepared in Examples 1 to 3 using the TGA 2 equipment of Mettler Toledo Company.

FIG. 5 shows the thermogravimetric change of the carbon nanotube containing molybdenum disulfide prepared in Examples 1 to 3, respectively, and through this, it was confirmed the content of molybdenum disulfide contained in the carbon nanotube according to each Example by confirming the rapid decrease in weight at about 550° C. As a result, it can be seen that the preparation method according to the present invention can control the amount of molybdenum disulfide supported on the carbon nanostructure only by changing the concentration of the aqueous solution of molybdenum precursor and the content of sulfur.

Experimental Example 4: X-Ray Diffraction (XRD) Analysis

XRD analysis (D4 Endeavor of Bruker Company) was performed for carbon nanotubes containing molybdenum disulfide prepared in Example 1.

FIG. 6 is a graph showing the results of XRD analysis for the carbon nanotube containing molybdenum disulfide prepared in Example 1.

Referring to FIG. 6, XRD peaks of (002), (100), and (110) planes were found at $2\theta=13.5\pm0.2°$, $32.8\pm0.2°$, and $58.5\pm0.2°$, respectively ($MoS_2$), and XRD peaks of the (002) and (100) planes were found at $2\theta=25.3\pm0.2°$ and $42.9\pm0.2°$, respectively (CNT). Therefore, it was confirmed that the carbon nanostructure comprising molybdenum disulfide (MoS$_2$) of the pure phase according to the present invention was prepared.

In addition, it was confirmed that the molybdenum precursor adsorbed on the surface of the carbon nanotube is reacted with excess sulfur to form crystalline molybdenum disulfide and that since no XRD peak of sulfur was observed, all of the excess sulfur was removed during the temperature rise by heat treatment.

Example 4: Preparation of Lithium Secondary Battery Comprising Positive Electrode to which Carbon Nanostructure Comprising Molybdenum Disulfide was Added First, the carbon nanotube containing 5 parts by weight of molybdenum disulfide (MoS$_2$) prepared in the above-described preparation examples, relative to the total weight (100 parts by weight) of the base solids (the active material, the electrically conductive material, and the binder) to which the carbon nanotube containing molybdenum disulfide (MoS$_2$) prepared in Example 1 will be added, was dissolved in water as a solvent. Subsequently, a total of 100 parts by weight of the base solids relative to the obtained solution, that is, 90 parts by weight of the sulfur-carbon composite (S/CNT 75:25 weight ratio) as the active material, 5 parts by weight of Denka black as the electrically conductive material, and 5 parts by weight of styrene butadiene rubber/carboxymethyl cellulose (SBR/CMC 7:3) as the binder was added and mixed to prepare a positive electrode slurry composition.

Subsequently, the prepared slurry composition was coated on a current collector (Al foil), dried at 50° C. for 12 hours, and pressed with a roll press device to prepare a positive electrode. At this time, the loading amount was 3.5 mAh/cm$^2$ and the porosity of the electrode was 65%.

Thereafter, a coin cell of a lithium secondary battery comprising the positive electrode prepared as described above, a negative electrode, a separator, and an electrolyte solution was prepared as follows. Specifically, the positive electrode was punched out as a circular electrode of 14 phi and used, polyethylene (PE) was punched out as a separator of 19 phi and used, and lithium metal with a thickness of 150 μm was punched out as a negative electrode of 16 phi and used.

Comparative Example 3: Preparation of Lithium Secondary Battery Comprising Positive Electrode to which Carbon Nanostructure Comprising Molybdenum Disulfide was not Added Without adding the carbon nanotube containing molybdenum disulfide, a total of 100 parts by weight of the base solids, that is, 90 parts by weight of the sulfur-carbon composite (S/CNT 75:25 weight ratio) as the active material, 5 parts by weight of Denka black as the electrically conductive material, 5 parts by weight of styrene butadiene rubber/carboxymethyl cellulose (SBR/CMC 7:3) as the binder was added and mixed to prepare a positive electrode slurry composition.

Subsequently, the prepared slurry composition was coated on a current collector (Al foil), and dried at 50° C. for 12 hours to prepare a positive electrode. At this time, the loading amount was 3.5 mAh/cm$^2$ and the porosity of the electrode was 60%.

Thereafter, a coin cell of a lithium secondary battery comprising the positive electrode prepared as described above, a negative electrode, a separator, and an electrolyte solution was prepared as follows. Specifically, the positive electrode was punched out as a circular electrode of 14 phi and used, polyethylene (PE) was punched out as a separator of 19 phi and used, and lithium metal with a thickness of 150 μm was punched out as a negative electrode of 16 phi and used.

Comparative Example 4: Preparation of Lithium Secondary Battery Comprising Positive Electrode to which Carbon Nanostructure not Containing Molybdenum Disulfide was Added A lithium secondary battery was prepared in the same manner as in Example 4, except that 4.4 parts by weight of carbon nanotube is added instead of the carbon nanotube containing molybdenum disulfide.

Experimental Example 5: Comparative Experiment of Discharging Capacity of Lithium Secondary Batteries In order to test the discharging capacity of the lithium secondary batteries depending on the type of positive electrode material, after configuring the positive electrode and the negative electrode of the lithium secondary batteries as shown in Table 1 below, the discharging capacity was measured. At this time, the measurement current was set at a voltage range of 1.8 to 2.5 V at 0.1 C, and the results are shown in FIG. 14.

TABLE 1

| | Lithium secondary battery | |
|---|---|---|
| | Negative electrode | Positive electrode |
| Example 4 | metal lithium | sulfur-carbon composite (S/C 75:25) + electrically conductive material + binder + CNT containing MoS$_2$ of Example 1 (5 parts by weight) (90:5:5:5, weight ratio) |
| Comparative Example 3 | metal lithium | sulfur-carbon composite (S/C 75:25) + electrically conductive material + binder (90:5:5, weight ratio) |
| Comparative Example 4 | metal lithium | sulfur-carbon composite (S/C 75:25) + electrically conductive material + binder + carbon nanotube (4.4 parts by weight) (90:5:5:4.4, weight ratio) |

As shown in FIG. 14, in the case of the battery according to Example 4 which comprises the carbon nanotube containing molybdenum disulfide, it was confirmed that the overvoltage of the battery was improved and the initial discharging capacity was further increased, as compared to Comparative Example 3. In addition, in the case of the battery of Example 4, it was confirmed that the initial discharging capacity was increased and the overvoltage was improved, as compared to the case of Comparative Example 4 in which only a single carbon nanotube except for the content of molybdenum disulfide according to Example 4 was added to confirm the effect by molybdenum disulfide.

Therefore, the carbon nanostructure comprising molybdenum disulfide (MoS$_2$) according to the present invention was found to be effective in increasing the initial discharging capacity and improving the overvoltage of the lithium secondary battery.

Experimental Example 6: Comparative Experiment of Lifetime Characteristics of Lithium Secondary Batteries In order to test the lifetime characteristics of the lithium-sulfur batteries depending on the type of the positive electrode material, after configuring the positive electrode and the negative electrode of the lithium secondary batteries as shown in Table 1 above, the discharging capacity according to the cycle was measured, and the results are shown in FIG. 15. The measurement was carried out by repeating the cycles at 0.3 C/0.5 C (charging/discharging), after 3 cycles at 0.1 C/0.1 C and 3 cycles at 0.2 C/0.2 C.

As shown in FIG. 15, in the case of the lithium secondary battery of Example 4, it was confirmed that the discharging capacity is higher in the section of 0.1 C, 0.2 C, and 0.5 C, and the lifetime characteristics are also improved, as compared to Comparative Examples 3 and 4. From these results, it was confirmed that when the carbon nanotube containing molybdenum disulfide of Example 1 was added to the positive electrode of the lithium secondary battery, the lithium secondary battery has an excellent discharging capacity effect and no lifetime inhibiting factor, due to the adsorption of lithium polysulfide generated during the charging and discharging process of the battery and the increase of the reactivity of the battery.

The invention claimed is:

1. A method for preparing a carbon nanostructure comprising molybdenum disulfide, which comprises the steps of:
   (1) preparing a mixed solution by adding a carbon nanostructure to a solution comprising molybdenum precursor and a solvent;
   (2) drying the mixed solution to remove the solvent, and then mixing the dried result with sulfur to melt and diffuse; and
   (3) heat-treating the molten and diffused mixture from step (2),
   wherein in the mixing of step (2), a molar ratio of molybdenum:sulfur is 1:8 or more.

2. The method for preparing the carbon nanostructure comprising molybdenum disulfide according to claim 1, wherein the carbon nanostructure in step (1) comprises at least one selected from the group consisting of carbon nanotube, carbon nanofiber, carbon nanoribbon, carbon nanobelt, carbon nanorod, and graphene.

3. The method for preparing the carbon nanostructure comprising molybdenum disulfide according to claim 1, wherein the carbon nanostructure in step (1) is a carbon nanostructure containing a dispersant coated on its surface.

4. The method for preparing the carbon nanostructure comprising molybdenum disulfide according to claim 1, wherein the molybdenum precursor is $(NH_4)_6Mo_7O_{24} \cdot 4H_2O$.

5. The method for preparing the carbon nanostructure comprising molybdenum disulfide according to claim 1, wherein the melt diffusion of step (2) is carried out at 140° C. to 160° C. for 20 minutes to 1 hour.

6. The method for preparing the carbon nanostructure comprising molybdenum disulfide according to claim 1, wherein the heat treatment of step (3) is carried out at 400° C. to 600° C. for 0.5 hours to 2 hours in an inert gas atmosphere or in a state in which inert gas is continuously introduced, and a heating rate is controlled between 5° C. per minute and 20° C. per minute.

7. A positive electrode for a lithium secondary battery comprising an active material, an electrically conductive material, a binder, and a carbon nanostructure comprising molybdenum disulfide ($MoS_2$),
   wherein the molybdenum disulfide is located on a surface of the carbon nanostructure.

8. The positive electrode for the lithium secondary battery according to claim 7, wherein a content of the carbon nanostructure comprising molybdenum disulfide is 0.1 parts by weight to 15 parts by weight relative to 100 parts by weight of base solids present in the positive electrode, said base solids comprising the active material, the electrically conductive material and the binder.

9. The positive electrode for the lithium secondary battery according to claim 7, wherein the molybdenum disulfide is present to a thickness of 1 nm to 10 nm on the surface of the carbon nanostructure.

10. The positive electrode for the lithium secondary battery according to claim 7, wherein the carbon nanostructure comprising molybdenum disulfide is crystalline.

11. The positive electrode for the lithium secondary battery according to claim 7, wherein the molybdenum disulfide is present in an amount of 10 parts by weight to 50 parts by weight relative to a total of 100 parts by weight of the carbon nanostructure comprising molybdenum disulfide.

12. The positive electrode for the lithium secondary battery according to claim 7, wherein the active material is a sulfur-carbon composite, and the sulfur-carbon composite has a sulfur content of 60 parts by weight to 80 parts by weight based on 100 parts by weight of sulfur-carbon composite.

13. A lithium secondary battery comprising a positive electrode, a negative electrode, a separator interposed therebetween, and an electrolyte, wherein the positive electrode is the positive electrode of claim 7.

* * * * *